US011382048B2

(12) United States Patent
Gaal et al.

(10) Patent No.: US 11,382,048 B2
(45) Date of Patent: Jul. 5, 2022

(54) MULTIPLEXING SOLUTIONS IN DUAL CONNECTIVITY

(71) Applicant: QUALCOMM Incorporated, San Diego, CA (US)

(72) Inventors: Peter Gaal, San Diego, CA (US); Alexei Yurievitch Gorokhov, San Diego, CA (US); Gene Fong, San Diego, CA (US); Timo Ville Vintola, San Diego, CA (US); Xiao Feng Wang, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/417,557

(22) Filed: May 20, 2019

(65) Prior Publication Data

US 2019/0364517 A1   Nov. 28, 2019

Related U.S. Application Data

(60) Provisional application No. 62/684,182, filed on Jun. 12, 2018, provisional application No. 62/675,155, filed on May 22, 2018.

(51) Int. Cl.
*H04W 84/12* (2009.01)
*H04W 52/34* (2009.01)
*H04W 52/14* (2009.01)
*H04W 76/16* (2018.01)
*H04W 88/06* (2009.01)

(52) U.S. Cl.
CPC ....... *H04W 52/346* (2013.01); *H04W 52/146* (2013.01); *H04W 76/16* (2018.02); *H04W 88/06* (2013.01)

(58) Field of Classification Search
CPC ............... H04W 16/14; H04W 52/146; H04W 72/0473; H04W 84/042; H04W 84/12
See application file for complete search history.

(56) References Cited

U.S. PATENT DOCUMENTS

2017/0013565 A1\* 1/2017 Pelletier .............. H04W 52/343
2017/0230843 A1   8/2017 Ouchi et al.
(Continued)

FOREIGN PATENT DOCUMENTS

WO   WO2018064009 A   4/2018

OTHER PUBLICATIONS

CATT: "Correction on Power Sharing for ENDC", 3GPP Draft; R1-1800267 Powersharing ENDC, 3rd Generation Partnership Project (3GPP), Mobile Competence Centre, 650, Route Des Lucioles, F-06921 Sophia-Antipolis Cedex, France vol. RAN WG1 No. Vancouver, Canada; Jan. 22, 2018-Jan. 26, 2018 Jan. 13, 2018, XP051384745, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018], 4 pages.
(Continued)

*Primary Examiner* — Tu X Nguyen
(74) *Attorney, Agent, or Firm* — Qualcomm Incorporated

(57) ABSTRACT

Methods, systems, and devices for wireless communications are described. A user equipment (UE) may determine that uplink communications are to be performed between the UE and a first cell group associated with a first radio access technology (RAT) and between the UE and a second cell group associated with a second RAT. The UE may determine that the UE is configured for power sharing for the uplink communications with the first cell group associated with the first RAT and the second cell group associated with the second RAT. The UE may calculate, based at least in part on the power sharing and the uplink communications, a power
(Continued)

reduction factor for the uplink communications between the UE and the second cell group. The UE may perform the uplink communications with the first cell group and selectively perform the uplink communications with the second cell group.

72 Claims, 11 Drawing Sheets

(56) References Cited

U.S. PATENT DOCUMENTS

| | | |
|---|---|---|
| 2018/0014255 A1 | 1/2018 | Pelletier et al. |
| 2018/0242264 A1* | 8/2018 | Pelletier .............. H04W 52/146 |
| 2019/0104476 A1 | 4/2019 | Lim et al. |
| 2019/0132803 A1 | 5/2019 | Kim et al. |

OTHER PUBLICATIONS

CATT: "Dynamic Power Sharing for NE-DC", 3GPP Draft; R1-1806302, NE-DC_Power Sharing, 3rd Generation Partnership Project (3GPP), Mobile Competence Centre, 650, Route Des Lucioles, F-06921 Sophia-Antipolis Cedex, France vol. RAN WG1 No. Busan, South Korea; May 21, 2018-May 25, 2018 May 20, 2018, XP051441509, Retrieved from the Internet: URL:http://www.3gpp.org/ftp/Meetings%5F3GPP%5FSYNC/RAN1/Docs/ [retrieved on May 20, 2018], 4 pages.
ERICSSON: "Configured output power for EN-DC", 3GPP Draft; R4-1806725, 3rd Generation Partnership Project (3GPP), Mobile Competence Centre, 650, Route Des Lucioles, F-06921 Sophia-Antipolis Cedex, France vol. TSG RAN, No. Busan. South Korea; May 21, 2018-May 25, 2018, May 20, 2018, XP051446377, Retrieved from the Internet: URL:http://www.3gpp.org/ftp/Meetings%5F3GPP%5FSYNC/RAN4/Docs/ [retrieved on May 20, 2018], Sections 3.1 and 3.2, 6 pages.
Huawei et al., "Way Forward on LTE-NR Uplink Sharing from UE Perspective", 3GPP Draft; RP-180502, 3rd Generation Partnership Project (3GPP), Mobile Competence Centre, 650, Route Des Lucioles, F-06921 Sophia-Antipolis Cedex, France vol. RAN WG4 No. Chennai, India; Mar. 19, 2018-Mar. 22, 2018 Mar. 20, 2018, XP051411082, Retrieved from the Internet: URL:http://www.3gpp.org/ftp/Meetings%5F3GPP%5FSYNC/RAN/Docs/ [retrieved on Mar. 20, 2018], 3 pages.
International Search Report and Written Opinion—PCT/US2019/033257—ISA/EPO—dated Aug. 12, 2019.

* cited by examiner

MULTIPLEXING SOLUTIONS IN DUAL CONNECTIVITY

CROSS REFERENCE

The present Application for Patent claims the benefit of U.S. Provisional Patent Application No. 62/675,155 by GAAL, et al., entitled "MULTIPLEXING SOLUTIONS IN DUAL CONNECTIVITY," filed May 22, 2018; and claims the benefit of U.S. Provisional Patent Application No. 62/684,182 by GAAL, et al., entitled "MULTIPLEXING SOLUTIONS IN DUAL CONNECTIVITY," filed Jun. 12, 2018, each of which is assigned to the assignee hereof and expressly incorporated herein.

BACKGROUND

The following relates generally to wireless communications and to multiplexing solutions in dual connectivity.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support multiplexing solutions in dual connectivity. Generally, the described techniques provide for time division multiplexing (TDM) and/or frequency division multiplexing (FDM) implementation in a dual connectivity (DC) mode, such as an evolved universal terrestrial access network (E-UTRAN) New Radio (NR) DC (EN-DC) scenario. Broadly, aspects of the described techniques provide a mechanism for UE to perform power sharing or reduction operations on one or both of a master cell group (MCG) (e.g., a first cell group) and a secondary cell group (SCG) (e.g., a second cell group) in a DC mode. For example, the UE may be operating in a DC mode with connections to the MCG and the SCG. In some aspects, the MCG may be associated with a long term evolution (LTE) radio access technology (RAT) and the SCG may be associated with an NR RAT. The UE may determine that the UE has uplink communications to perform with the MCG in the SCG and that the UE is configured for power sharing, e.g., including maximum power reduction (MPR) and/or advanced MPR (A-MPR) operations. The UE may calculate a power reduction factor for the uplink communications between the UE and the SCG and/or for the uplink communications between the UE and the MCG. In some aspects, based on the power reduction factor, the UE may perform power reduction for the uplink communications to the MCG and/or the SCG. In other aspects, based on the power reduction factor, the UE may drop the uplink communications with the SCG. Accordingly, the UE may perform the uplink communications with the MCG and selectively perform the uplink communications with the SCG.

A method of wireless communication at a UE is described. The method may include determining that uplink communications are to be performed between the UE and a first cell group associated with a first RAT and between the UE and a second cell group associated with a second RAT, determining that the UE is configured for power sharing for the uplink communications with the first cell group associated with the first RAT and the second cell group associated with the second RAT, calculating, based on the power sharing and the uplink communications, a power reduction factor for the uplink communications between the UE and the second cell group, and performing the uplink communications with the first cell group and selectively performing, based on the power reduction factor, the uplink communications with the second cell group.

An apparatus for wireless communication at a UE is described. The apparatus may include a processor, memory coupled with the processor, and instructions stored in the memory. The instructions may be executable by the processor to cause the apparatus to determine that uplink communications are to be performed between the UE and a first cell group associated with a first RAT and between the UE and a second cell group associated with a second RAT, determine that the UE is configured for power sharing for the uplink communications with the first cell group associated with the first RAT and the second cell group associated with the second RAT, calculate, based on the power sharing and the uplink communications, a power reduction factor for the uplink communications between the UE and the second cell group, and perform the uplink communications with the first cell group and selectively performing, based on the power reduction factor, the uplink communications with the second cell group.

Another apparatus for wireless communication at a UE is described. The apparatus may include means for determining that uplink communications are to be performed between the UE and a first cell group associated with a first RAT and between the UE and a second cell group associated with a second RAT, determining that the UE is configured for power sharing for the uplink communications with the first cell group associated with the first RAT and the second cell group associated with the second RAT, calculating, based on the power sharing and the uplink communications, a power reduction factor for the uplink communications between the UE and the second cell group, and performing the uplink communications with the first cell group and selectively performing, based on the power reduction factor, the uplink communications with the second cell group.

A non-transitory computer-readable medium storing code for wireless communication at a UE is described. The code may include instructions executable by a processor to determine that uplink communications are to be performed between the UE and a first cell group associated with a first RAT and between the UE and a second cell group associated with a second RAT, determine that the UE is configured for power sharing for the uplink communications with the first cell group associated with the first RAT and the second cell group associated with the second RAT, calculate, based on the power sharing and the uplink communications, a power reduction factor for the uplink communications between the UE and the second cell group, and perform the uplink communications with the first cell group and selectively performing, based on the power reduction factor, the uplink communications with the second cell group.

Some examples of the method, apparatuses, and non-transitory computer-readable medium described herein may further include operations, features, means, or instructions for determining that the uplink communications with the first cell group at least partially overlap in time with the uplink communications with the second cell group, where the power reduction factor may be based on the overlap.

Some examples of the method, apparatuses, and non-transitory computer-readable medium described herein may further include operations, features, means, or instructions for determining, based on the power reduction factor, that the uplink communications with the first cell group include a reduced transmit power transmission and performing, based on the reduced transmit power, at least one of reducing the transmit power or dropping the uplink communications with the second cell group.

Some examples of the method, apparatuses, and non-transitory computer-readable medium described herein may further include operations, features, means, or instructions for determining, based on the power reduction factor, that the uplink communications with the second cell group include a reduced transmit power transmission and performing, based on the reduced transmit power, at least one of reducing the transmit power or dropping the uplink communications with the second cell group.

Some examples of the method, apparatuses, and non-transitory computer-readable medium described herein may further include operations, features, means, or instructions for determining that a first frequency band of the uplink communications with the first cell group at least partially overlap in frequency with a second frequency band of the uplink communications with the second cell group, where the power reduction factor may be based on the overlap.

Some examples of the method, apparatuses, and non-transitory computer-readable medium described herein may further include operations, features, means, or instructions for determining that that the UE may be configured for a UE capability where a first transmit power for the uplink communications of the first cell group and a second transmit power for the uplink communications of the second cell group may be considered together when calculating the power reduction factor and calculating, based on the UE capability, an asymmetric power reduction factor for the uplink communications with the first cell group and with the second cell group.

Some examples of the method, apparatuses, and non-transitory computer-readable medium described herein may further include operations, features, means, or instructions for determining that that the UE may be configured for a UE capability where a first transmit power for the uplink communications of the first cell group and a second transmit power for the uplink communications of the second cell group may be not considered together when calculating the power reduction factor and calculating, based on the UE capability, a symmetric power reduction factor for the uplink communications with the first cell group and with the second cell group.

In some examples of the method, apparatuses, and non-transitory computer-readable medium described herein, calculating the power reduction factor may include operations, features, means, or instructions for calculating a first transmit power for the uplink communications with the first cell group independent from a calculation of a second transmit power for the uplink communications with the second cell group and calculating a third transmit power for the uplink communications with the first cell group in consideration of a calculation of a fourth transmit power for the uplink communications with the second cell group.

Some examples of the method, apparatuses, and non-transitory computer-readable medium described herein may further include operations, features, means, or instructions for determining that a transmit power difference between the first transmit power and the third transmit power satisfies a threshold and dropping, based on the transmit power difference, from performing the uplink communications with the second cell group.

Some examples of the method, apparatuses, and non-transitory computer-readable medium described herein may further include operations, features, means, or instructions for determining that a transmit power difference between the second transmit power and the fourth transmit power satisfies a threshold and dropping, based on the transmit power difference, the uplink communications with the second cell group.

Some examples of the method, apparatuses, and non-transitory computer-readable medium described herein may further include operations, features, means, or instructions for determining that the first transmit power calculated for the uplink communications with the first cell group equals the third transmit power calculated for the uplink communications with the first cell group, transmitting the uplink communications with the first cell group using the third transmit power based on determining that the first transmit power equals the third transmit power and transmitting the uplink communications with the second cell group using the fourth transmit power based on determining that the first transmit power equals the third transmit power, where performing the uplink communications may be based on transmitting the uplink communications with the first cell group using the third transmit power and transmitting the uplink communications with the second cell group using the fourth transmit power.

Some examples of the method, apparatuses, and non-transitory computer-readable medium described herein may further include operations, features, means, or instructions for determining that the first transmit power calculated for the uplink communications with the first cell group may be different than the third transmit power calculated for the uplink communications with the first cell group and selecting a fifth transmit power for the uplink communications with the second cell group based on determining that the first transmit power may be different than the third transmit power, where the fifth transmit power may be less than the fourth transmit power, where performing the uplink communications may be based on selecting the fifth transmit power.

Some examples of the method, apparatuses, and non-transitory computer-readable medium described herein may further include operations, features, means, or instructions for selecting a sixth transmit power for the uplink communications with the first cell group based on selecting the fifth transmit power, where the sixth transmit power may be less than the first transmit power and may be greater than the third transmit power, where performing the uplink communications may be based on selecting the sixth transmit power.

Some examples of the method, apparatuses, and non-transitory computer-readable medium described herein may further include operations, features, means, or instructions for determining that the second cell group uses a timeline that may be compatible with the first cell group, where calculating the power reduction factor may be based on determining that the second cell group uses the timeline that may be compatible with the first cell group.

In some examples of the method, apparatuses, and non-transitory computer-readable medium described herein, calculating the power reduction factor may include operations, features, means, or instructions for determining whether a first communication schedule for the uplink communications with the first cell group may be time aligned with respect to a second communication schedule for the uplink communications with the second cell group, where selectively performing the uplink communications with the second cell group may be based on the time alignment.

In some examples of the method, apparatuses, and non-transitory computer-readable medium described herein, calculating the power reduction factor may include operations, features, means, or instructions for determining whether a first grant for the uplink communications with the first cell group may be received within a defined time window with respect to a second grant for the uplink communications with the second cell group, where selectively performing the uplink communications with the second cell group may be based on the first and second grants being received within the time window.

In some examples of the method, apparatuses, and non-transitory computer-readable medium described herein, calculating the power reduction factor may include operations, features, means, or instructions for determining whether a first boundary for the uplink communications with the first cell group may be aligned with respect to a second boundary for the uplink communications with the second cell group, where selectively performing the uplink communications with the second cell group may be based on the alignment.

In some examples of the method, apparatuses, and non-transitory computer-readable medium described herein, the first RAT includes an LTE RAT and the second RAT includes an NR RAT.

DETAILED DESCRIPTION

Figure 1:
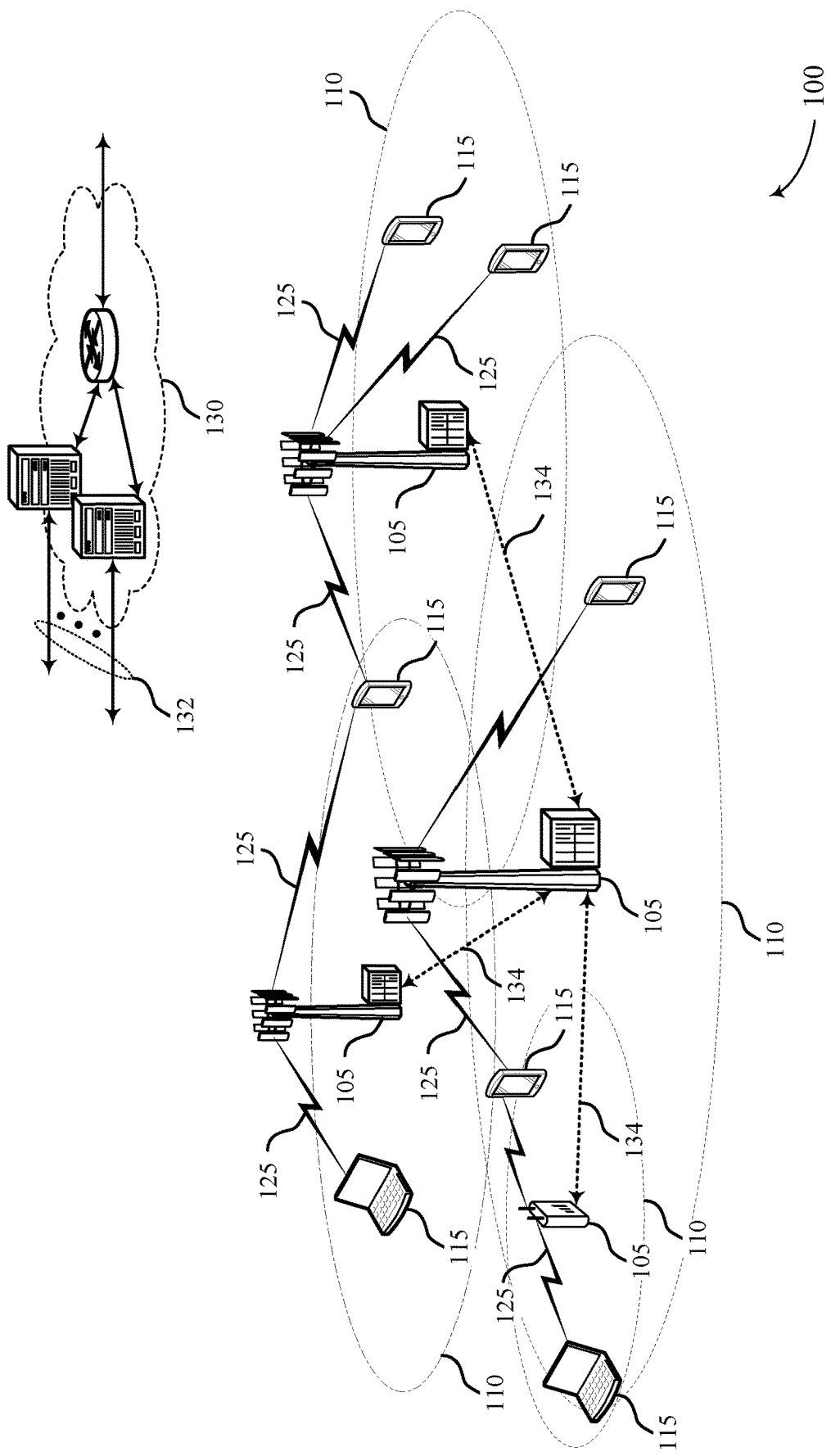
FIG. 1 illustrates an example of a system for wireless communications that supports multiplexing solutions in dual connectivity in accordance with aspects of the present disclosure.

Some wireless communications systems may be configured for dual connectivity (DC), where the UE can communicate with an MCG and an SCG In some aspects, a user equipment (UE) may be configured for power sharing operations when operating in a dual connectivity (DC) mode. For example, the UE may be operating in the DC mode and perform communications with a master cell group (MCG) and a secondary cell group (SCG), with each cell group being associated with a different radio access technology (RAT). For example, the MCG may be associated with an LTE RAT, and the SCG may be associated with an NR RAT. The UE may be configured to support power sharing, at least to some degree, for the communications with the MCG and/or the SCG.

Some communication scenarios may have associated power limitations, e.g., certain configurations may be limited to a maximum power headroom such that total transmission power is limited for the combined transmissions to the MCG and the SCG, which may result in inefficient power management. For example, conventional techniques may not support the actual transmit power of one cell group being considered in calculating the transmit power of the other cell group. Moreover, conventional techniques may not support uplink time division multiplexing (TDM) and/or frequency division multiplexing (FDM) techniques in the context of DC that fully support downlink resource utilization. Thus, conventional techniques may not provide a mechanism where dynamic power sharing is supported in multiple scenarios (e.g., for TDM and FDM) such that the UE can dynamically adjust the transmit power for multiplexed communications with the MCG and/or the SCG. As described herein, in some cases, a UE may be configured to dynamically manage the power associated with transmission to the MCG and SCG. For example, a UE may be configured to calculate power for the MCG and SCG uplink transmissions separately, under the assumption that each RAT is operating independently. The UE may also be configured to calculate the power for the MCG and SCG uplink transmissions together (e.g., according to MPR and/or A-MPR guidelines, which may specify an allowed amount of power decrease associated with transmissions). In some cases, if the power calculated for the MCG and SCG uplink transmission together differs from either the power calculated for the MCG separately or the power calculated for the SCG separately, the UE may reduce the power associated with transmission to the SCG or drop (e.g., refrain from performing) the uplink transmission to the SCG.

Aspects of the disclosure are initially described in the context of a wireless communications system. In some aspects, the UE may be configured for communicating in a DC mode with an MCG (e.g., a first cell group) and an SCG (e.g., a second cell group). The UE may determine that the UE has uplink communications to perform between the UE and the MCG and the UE and the SCG. In some aspects, the MCG in the SCG may be associated with different RATs, e.g., the MCG may be associated with an LTE RAT and the SCG may be associated with an NR RAT. The UE may determine that it is configured for power sharing for the uplink communications. Accordingly, the UE may calculate a power reduction factor for uplink communications between the UE and the SCG and/or between the UE and the MCG. Based on the power reduction factor, the UE may perform the uplink communications with the MCG and selectively perform uplink communications with the SCG. In some aspects, selectively performing the uplink communications with the SCG may include the UE dropping the uplink communications with the SCG or the UE adjusting the transmit power for the uplink communications with the SCG. In some aspects, the UE may also adjust the transmit power for the uplink communications with the MCG based on the power reduction factor.

Aspects of the disclosure are further illustrated by and described with reference to apparatus diagrams, system diagrams, and flowcharts that relate to multiplexing solutions in dual connectivity.

FIG. 1 illustrates an example of a wireless communications system 100 that supports multiplexing solutions in DC in accordance with aspects of the present disclosure. The wireless communications system 100 includes base stations 105, UEs 115, and a core network 130. In some examples, the wireless communications system 100 may be an LTE network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may determine that uplink communications are to be performed between the UE and a first cell group associated with a first RAT and between the UE and a second cell group associated with a second RAT. The UE 115 may determine that the UE is configured for power sharing for the uplink communications with the first cell group associated with the first RAT and the second cell group associated with the second RAT. The UE 115 may calculate, based on the power sharing and the uplink communications, a power reduction factor for the uplink communications between the UE and the second cell group. The UE 115 may perform the uplink communications with the first cell group and selectively performing, based on the power reduction factor, the uplink communications with the second cell group.

Figure 2:
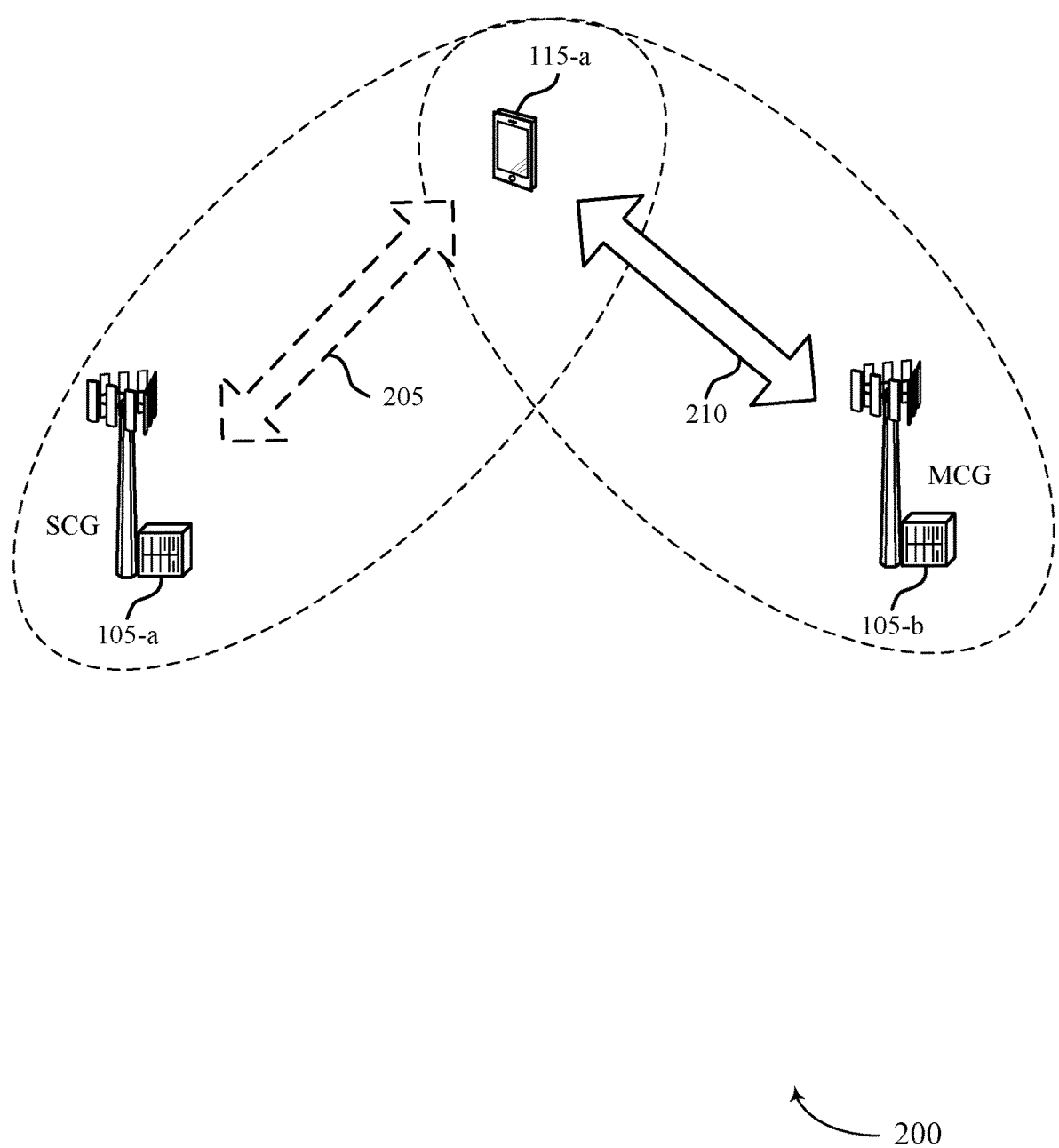
FIG. 2 illustrates an example of a wireless communication system that supports multiplexing solutions in dual connectivity in accordance with aspects of the present disclosure.

FIG. 2 illustrates an example of a wireless communications system 200 that supports multiplexing solutions in DC in accordance with aspects of the present disclosure. In some examples, wireless communications system 200 may implement aspects of wireless communications system 100. Wireless communications system 200 may include a base station 105-a, a base station 105-b, and a UE 115-a, which may be examples of base stations 105 and UEs 115 as described herein. Base station 105-a may be associated with a SCG and may be referred to as SCG 105-a. Base station 105-b may be associated with an MCG and may be referred to as MCG 105-b. Accordingly, UE 115-a may be configured to operate in DC to communicate with SCG 105-a and MCG 105-b (e.g., simultaneously, serially, using TDM or FDM, etc.) using aspects of the described power sharing techniques. In some cases, UE 115-a may be initially configured to communicate with SCG 105-a on a secondary serving cell on a secondary carrier 205 and to communicate with MCG 105-b on a master serving cell on a primary carrier 210.

In some cases, MCG 105-b may be associated with a first RAT (e.g., an LTE RAT) and the SCG 105-a may be associated with a second RAT (e.g., an NR RAT). In some aspects, each RAT may have an associated set of protocols configured to support power sharing when operating in a DC mode. In some aspects, the corresponding set of protocols in conventional wireless communication systems may not be configured to support each other. Thus, aspects of wireless communications system 200 may provide an efficient mechanism for DC operations with different RATs.

In some aspects, wireless communications system 200 may support aspects of power sharing operations. For example, in some aspects MCG 105-b and SCG 105-a may have limited coordination on the network side (e.g., Type II) where a semi-static TDM pattern is supported. In other examples, MCG 105-b and SCG 105-a may have more complex coordination on the network side (e.g., Type I) where dynamic coordination is supported and can be adjusted based on traffic needs.

As described herein, UE 115-a may identify or otherwise determine that uplink communications are to be performed between UE 115-a and MCG 105-b and between UE 115-a and SCG 105-a. In some aspects, this may include UE 115-a receiving a grant from MCG 105-b and a grant from SCG 105-a, respectively. In some aspects, the grants may carry or otherwise provide an indication of resources to use for the corresponding uplink communications. For example, each grant may have an indication of frequency resources and/or time resources to be used for the corresponding uplink communications.

In some aspects, UE 115-a may determine that it is configured for power sharing for the uplink communications. In some aspects, this may include UE 115-a calculating a power reduction factor for the uplink communications between UE 115-a and MCG 105-b and/or between UE 115-a and SCG 105-a. For example, UE 115-a may determine that it is a Type 1 UE that supports dynamic sharing capability in a DC mode or that it is a Type II UE that has a more limited dynamic sharing capability. For example, a Type I UE may be configured such that transmit power for uplink communications for both the MCG 105-b and the SCG 105-a are known and considered together when performing power sharing and reduction operations, e.g., when performing maximum power reductions (MPR), advanced MPR (A-MPR) operations, and the like. As another example, a Type II UE may be configured such that the transmit power for uplink communications for both MCG 105-b and SCG 105-a are not known or otherwise considered together when performing power sharing and reduction operations. In other examples, UE 115-a may know, but may not consider, the transmit power for uplink communications for both MCG 105-b and SCG 105-a. In some aspects, this may include UE 115 performing asymmetric MPR/A-MPR for Type I UEs and performing symmetric MPR/A-MPR for Type II UEs.

In some aspects, the described techniques may allow wide discretion for UE 115-a to drop uplink communications between UE 115-a and SCG 105-a. For example, UE 115-a may calculate the power (e.g., a transmit power) for uplink communications between UE 115-a and MCG 105-b and calculate the power for uplink communications between UE 115-a and SCG 105-a separately, e.g., may consider the transmit powers independently for the respective uplink communications. UE 115-a may then calculate the power for uplink communications between UE 115-a and MCG 105-b and calculate the power for uplink communications between UE 115-a and SCG 105-a together, e.g., may consider the transmit powers together for the uplink communications. In some aspects, UE 115-a may determine if the power calculated separately and the power calculated together are within a defined range of each other. If the calculated transmit powers are within the defined range, UE 115-a may perform the power reduction operations for the uplink communications with MCG 105-b and with SCG 105-a. If the calculated transmit powers are not within the defined range, UE 115-a may drop the uplink communications with SCG 105-a and/or reduce the transmit power for the uplink communications with SCG 105-a.

In some aspects, UE 115-a may be configured to 'slow down' uplink communications between the UE 115-a and SCG 105-a. For example, UE 115-a may perform the power sharing operations discussed herein and also determine whether a timeline (e.g., communication schedule) for the uplink communications with SCG 105-*a* are compatible with the timeline for the uplink communications with MCG 105-*b*. If the timeline for the uplink communications with SCG 105-*a* and MCG 105-*b* are compatible, UE 115-*a* may perform the uplink communications with MCG 105-*b* and SCG 105-*a*. If the timelines for the uplink communications with SCG 105-*a* and MCG 105-*b* are not compatible, UE 115-*a* may drop the uplink communications with SCG 105-*a*.

In some aspects, UE 115-*a* may not perform power sharing operations for uplink communications with MCG 105-*b*. For example, UE 115-*a* may determine whether the grant for the uplink communications with MCG 105-*b* is received within a defined time window with respect to a grant for the uplink communications with SCG 105-*a*. In some aspects, UE 115-*a* may not consider any grant received for uplink communications with SCG 105-*a* that is received outside of the defined time window when performing power sharing operations. Accordingly, UE 115-*a* may not update power headroom (PHR) for uplink communications with MCG 105-*b*, e.g., may disregard the uplink communications with the SCG 105-*a* for PHR computation for the MCG 105-*b*.

In some aspects, UE 115-*a* may determine whether there is symbol alignment for the uplink communications with MCG 105-*b* and SCG 105-*a*. For example, when the uplink communications with MCG 105-*b* and SCG 105-*a* share a similar transmit chain/power amplifier, UE 115-*a* may determine whether the boundaries for the uplink communications with MCG 105-*b* and SCG 105-*a* are aligned. Accordingly, UE 115-*a* may be configured to ensure that the stop and start time and hop boundaries for the uplink communications with MCG 105-*b* and SCG 105-*a* are aligned. When the boundaries are not aligned, UE 115-*a* may drop the uplink communications with SCG 105-*a*, e.g., to avoid phase coherence issues.

In some aspects, UE 115-*a* may perform the uplink communications with MCG 105-*b* according to the described power sharing and reduction techniques. A UE 115-*a* may selectively perform the uplink communications with SCG 105-*a*, based on, for example, the power reduction factor, communication schedule, boundary alignment, and the like. In some aspects, when one or more conflicts arise with respect to uplink communications with SCG 105-*a*, UE 115-*a* may drop the uplink with SCG 105-*a* to protect the uplink communications with MCG 105-*b*.

Figure 3:
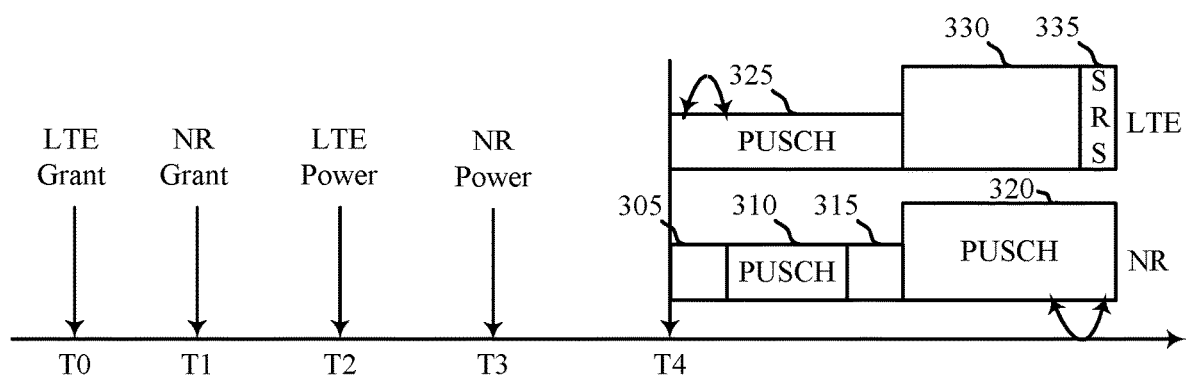
FIG. 3 illustrates an example of a timeline that supports multiplexing solutions in dual connectivity in accordance with aspects of the present disclosure.

FIG. 3 illustrates an example of a timeline 300 that supports multiplexing solutions in dual connectivity in accordance with aspects of the present disclosure. In some examples, timeline 300 may implement aspects of wireless communication systems 100, 200. Aspects of timeline 300 may be implemented by a UE and/or base station, which may be examples of the corresponding devices described herein.

At time T0, the UE may receive a grant from a first cell group (e.g., an MCG) that carries or otherwise provides an indication of resources to use for uplink communications with the MCG.

At time T1, the UE may receive a grant from a second cell group (e.g., an SCG) that carries or otherwise provides an indication of resources to use for uplink communications with the SCG. In some aspects, each grant may carry or otherwise provide an indication of the time and/or frequency resources to use for the corresponding uplink communications.

At time T2, the UE may calculate the transmit power for the uplink communications with the MCG. In some aspects, this may include the UE calculating or otherwise determining the transmit power for the uplink communications with the MCG assuming that there are no uplink communications scheduled with the SCG. In some aspects, power sharing operations (e.g., MPR/A-MPR) for the uplink communications may depend on the component carriers for the uplink communications with the MCG. Accordingly, the UE may determine the transmit power (e.g., based on the power headroom) for the uplink communications with the MCG assuming there are no uplink communications scheduled with a SCG.

At time T3, the UE may calculate or otherwise determine the transmit power for the uplink communications with the SCG. In some aspects, this may include the UE calculating the transmit power for the uplink communications to the SCG considering the transmit power for the uplink communications with the MCG. For example, the UE may determine the transmit power for the uplink communications with the MCG together with the transmit power for the uplink communications with the SCG. Based on this determination, the UE may determine whether to transmit or not transmit the uplink communications (e.g., selectively perform the uplink communications) with the SCG. When the UE determines to perform the uplink communications with the SCG, the UE may determine or otherwise calculate the gain for the uplink communications with the SCG and/or recalculate (e.g., re-scale) the transmit power for the uplink communications with the MCG.

In some aspects, if the UE determines that the transmit power for the uplink communications with the MCG will drop (e.g., will be lowered by some amount, or beyond a threshold value) in response to the transmit power for the uplink communications with the SCG, the UE may determine whether to drop the uplink communications with the SCG. In some aspects, the UE may determine whether the power headroom for the uplink communications with the MCG would change in response to the uplink communications with the SCG, and determine whether to transmit or drop the uplink communications with the SCG accordingly. In some aspects, the UE may determine whether the transmit power for the uplink communications with the SCG is changed in response to the transmit power for the uplink communications with the MCG, and determine whether to transmit or drop the uplink communications to the SCG.

At time T4, the UE may perform the uplink communications with the MCG (e.g., LTE RAT) and selectively perform the communications with the SCG (e.g., NR RAT, based on the UE capability). In some aspects, the uplink communications with the SCG may include a gap period 305, physical uplink shared channel (PUSCH) 310, a gap period 315, and PUSCH 320. In some aspects, the uplink communications with the MCG may include PUSCH 325, a gap period 330, and a sounding reference signal (SRS) 335.

In some aspects, the UE may determine whether to keep or drop (e.g., whether to perform or refrain from performing) the uplink communications with the SCG based on various timing parameters. For example, if the uplink communications with the SCG and the uplink communications with the MCG are not symbol aligned, the UE may determine to drop the uplink communications with the SCG. Moreover, if the timeline (e.g., communication schedule) for the uplink communications with the MCG in the SCG are not compatible, the UE may determine to drop the uplink communications with the SCG.

In some aspects, the UE may determine to drop the uplink communications with the SCG in order to avoid phase coherence issues (illustrated by the curved lines in PUSCH 325 and PUSCH 320). For example, if the UE begins transmitting PUSCH 310 while PUSCH 325 is ongoing, this may introduce phase coherence issues (e.g., a phase shift) for PUSCH 325. Similarly, if the UE begins transmitting SRS 335 while PUSCH 320 is ongoing, this may also introduce phase coherence issues for PUSCH 320. Accordingly, the UE may determine whether to perform the transmission or drop the transmission of the uplink communications with the SCG when the timing parameters are not compatible or would otherwise introduce phase coherence issues.

Figure 4:
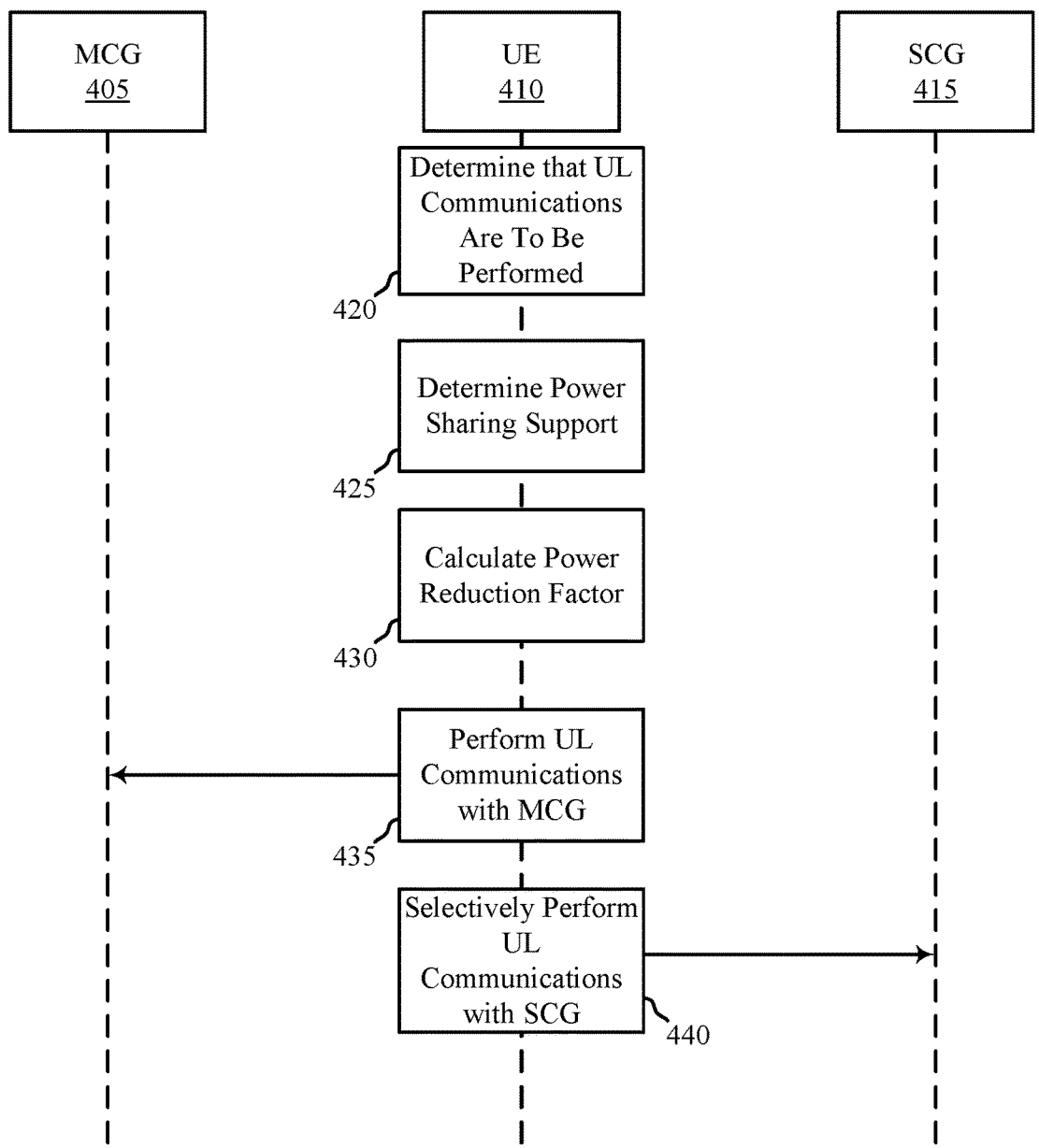
FIG. 4 illustrates an example of a process that supports multiplexing solutions in dual connectivity in accordance with aspects of the present disclosure.

FIG. 4 illustrates an example of a process 400 that supports multiplexing solutions in dual connectivity in accordance with aspects of the present disclosure. In some examples, process 400 may implement aspects of wireless communication systems 100/200 and/or timeline 300. Process 400 may include an MCG 405, a UE 410, and an SCG 415, which may be examples of the corresponding devices described herein. In some aspects, MCG 405 and/or SCG 415 may be examples of a base station. In some aspects, MCG 405 and SCG 415 may be associated with different RATs. In some aspects, MCG 405 may be referred to as a first cell group and SCG 415 may be referred to as a second cell group.

At 420, UE 410 may determine that uplink communications are to be performed between the UE and MCG 405 that is associated with a first RAT (e.g., LTE RAT) and SCG 415 that is associated with a second RAT (e.g., NR RAT). In some aspects, this may include UE 410 receiving a grant from MCG 405 and SCG 415 that carries or otherwise provides an indication of resources for the uplink communications.

At 425, UE 410 may determine that it is configured for power sharing for the uplink communications with the MCG 405 and the SCG 415. For example, UE 410 may be configured for different UE capabilities (e.g., Type 1 UE or Type II UE, a power sharing configuration, and the like). In some aspects, this may include UE 410 adjusting transmit powers for the uplink communications with the MCG 405 and/or SCG 415.

At 430, UE 410 may calculate, based on the power sharing in the uplink communications, a power reduction factor for the uplink communications between the UE 410 and the MCG 405 and/or the SCG 415.

In some aspects, this may include UE 410 determining that the uplink communications with MCG 405 overlap in time (at least to some degree) with the uplink communications with SCG 415. UE 410 may calculate the power reduction factor based on this overlap. For example, UE 410 may determine that the uplink communications with the MCG 405 include a reduced transmit power (e.g., based on the power reduction factor performed during the power sharing operations). UE 410 may determine whether to reduce the transmit power or drop the uplink communications with the SCG 415 based on the reduced transmit power for the uplink communications with MCG 405. As another example, UE 410 may determine that the uplink communications with SCG 415 include a reduced transmit power transmission. UE 410 may determine whether to reduce the transmit power or drop the uplink communications with SCG 415 based on the reduced transmit power for the uplink communications with SCG 415. As another example, UE 410 may determine that a first frequency band of the uplink communications with MCG 405 overlap (at least to some degree) in frequency with the frequency band of the uplink communications with SCG 415. UE 410 may calculate the power reduction factor based on this overlap.

In some aspects, this may include UE 410 considering both transmit powers for the uplink communications with MCG 405 and SCG 415 when calculating the power reduction factor. In some aspects, this may include UE 410 calculating an asymmetric power reduction factor for the uplink communications with MCG 405 and SCG 415, e.g., UE 410 calculating different power reduction factors for the uplink communications with MCG 405 and SCG 415.

In some aspects, this may include UE 410 not considering the transmit powers together with the uplink communications with MCG 405 and SCG 415 when calculating the power reduction factor. In this example, UE 410 may calculate asymmetric power reduction factor for the uplink communications with MCG 405 and SCG 415.

In some aspects, this may include UE 410 calculating a first transmit power for the uplink communications with MCG 405 and calculating of a second transmit power for uplink communications with SCG 415. UE 410 may then calculate the third transmit power for the uplink communications with MCG 405 considering together with a calculation of a fourth transmit power for uplink communications with SCG 415. UE 410 may determine that a transmit power difference between the first transmit power and the third transmit power satisfies a threshold and drop uplink communications with the SCG 415 based on the determination. UE 410 may determine that the transmit power difference between the second transmit power and the fourth transmit power satisfy a threshold and drop the uplink communications with the SCG 415 based on the determination.

In some aspects, the UE 410 may calculate a power reduction factor for the uplink communications between the UE 410 and the MCG 405 and/or the SCG 415 according to a first power procedure. The first power procedure may include a variety of operations. In a first operation, the UE 410 may calculate a first transmit power for the uplink communications with the MCG 405 (e.g., P_MCG_only) without considering the transmit power for the uplink communications with the SCG 415. In a second operation, the UE 410 may calculate a second transmit power for the uplink communications with the SCG 415 (e.g., P_SCG_only) without considering the transmit power for the uplink communications with the MCG 405. In a third operation, the UE 410 may calculate a third transmit power for the uplink communications with the MCG 405 (e.g., P_MCG) and a fourth transmit power for the uplink communications with the SCG 415 (e.g., P_SCG) according to a dynamic power sharing rule.

In a fourth operation, the UE 410 may determine the actual transmit powers for the uplink communications with the MCG 405 and the uplink communications with the SCG 415 based on variety of considerations. For example, if the transmit powers calculated in the first operation and the second operation differ from the transmit powers calculated in the third operation for either uplink communications with the MCG 405 or the uplink communications with the SCG 415, the UE 410 may scale down or drop the transmit power of the uplink communications with the SCG 415. In some examples, if P_MCG_only equals P_MCG and P_SCG_only equals P_SCG (e.g., P_MCG)_only==P_MCG && P_SCG_only==P_SCG), the UE 410 may transmit the uplink communications with the MCG 405 at P_MCG and the uplink communications with the SCG 415 at P_SCG. If this condition is not met, the UE 410 may select a new transmit power for the uplink communications with the SCG 415 (e.g., P_SCG'), where the new transmit power is less than P_SCG and greater than or equal to zero (e.g., 0<=P_SCG'<P_SCG). The new transmit power, P_SCG' for the uplink communications with the SCG 415 may represent a transmit power that is scaled down or dropped relative to P_SCG. The UE 410 may select a new transmit power for uplink communications with the MCG 405 (e.g., P_MCG') based on P_SCG'. In some examples, if P_SCG' equal zero, P_MCG' may be P_MCG_only. In some examples, if P_SCG' is equal to P_SCG, P_MCG' may be equal to P_MCG. In some examples, if P_SCG' is greater than zero but less than P_SCG, P_MCG' may be equal to some value between P_MCG and P_MCG_only (e.g., P_MCG<P_MCG'<P_MCG_only). In such examples, the UE 410 may determine the P_MCG' based on the P_SCG', such that the total transmit power does not exceed a threshold.

After performing the first power procedure, the UE 410 may transmit the uplink communications with the MCG 405 using a transmit power of P_MCG' and may transmit the uplink communications with the SCG 415 using a transmit power of P_SCG'. P_MCG' and P_SCG' may be determined based on the operations described above. The operations described above illustrate possible implementations of the first power procedure, and the operations and the steps may be rearranged or otherwise modified. Further, aspects from two or more of the procedures or operations may be combined.

In some aspects, the UE 410 may calculate a power reduction factor for the uplink communications between the UE 410 and the MCG 405 and/or the SCG 415 according to a second power procedure. The second power procedure may provide conditional power control operation based on one or more timeline requirements being satisfied. The second power procedure may be initiated if the UE 410 is a type 1 configured with intra-band EN-DC and the uplink communications with the MCG 405 overlap in time with the uplink communications with the SCG 415. The second power control procedure may be performed before the first power control procedure in some cases. These power procedures (both the first and second) may initiated based on the SCG 415 running on a timeline that is compatible with the MCG 405. For example, in cases where the MCG 405 is LTE and the SCG 415 is NR, and if the k1, k2 of the SCG 415 may be greater than or equal to 4 ms, the UE 410 may initiate these power procedures.

The UE 410 may determine whether the uplink communications with the SCG 415 are grant-based (e.g., PUSCH, A-CSI, A-SRS) and the grant triggering the uplink communications with the SCG 415 meets the timeline for the MCG 405. For FDD, to meet these conditions, the grant for the uplink communications with the SCG 415 may be no later than the first three symbols of the SCG slot starting a duration (e.g., 4 ms) before the start of the MCG subframe containing the uplink communications with the MCG 405. For TDD, to meet these conditions, the grant for the uplink communications with the SCG 415 may be no later than the associated MCG downlink control in the MCG TDD HARQ timeline.

The UE 410 may also determine whether certain communications meet the MCG HARQ timeline. For example, the UE 410 may determine whether the uplink communications with the SCG 415 that includes HARQ-ACK, the latest physical downlink shared channel (PDSCH) for the SCG 415 to which the HARQ-ACK corresponds, and/or the SCG downlink control associated with that PDSCH meet the MCG HARQ timeline. For FDD, to meet these conditions, the PDSCH for the SCG 415 may end no later than a duration (e.g., 3 ms) before the start of the MCG uplink subframe. For TDD, to meet these conditions, the PDSCH for the SCG 415 ends no later than the PDSCH for the MCG 405 in the MCG TDD HARQ timeline. In some cases, for either FDD and/or TDD, similar conditions may be met for the downlink control of the SCG 415 that grants the PDSCH for the SCG 415.

If the UE 410 determines that some or all of these described conditions are met, the UE 410 may perform one or more normal power control operations. For example, the UE 410 may initiate power control operations indicated in RAN1 and/or RAN4 definitions. In some cases, when some or all of these conditions are not met, the UE 410 may initiate the first power procedure described above.

At 435, UE 410 may perform uplink communications with the MCG 405, e.g., based on the power reduction factor. At 440, UE 410 may selectively perform uplink communications with SCG 415, e.g., based on the power reduction factor. In some aspects, this may include UE 410 either performing the transmissions of the uplink communications to SCG 415 or dropping the transmission of the uplink communications to SCG 415.

Figure 5:
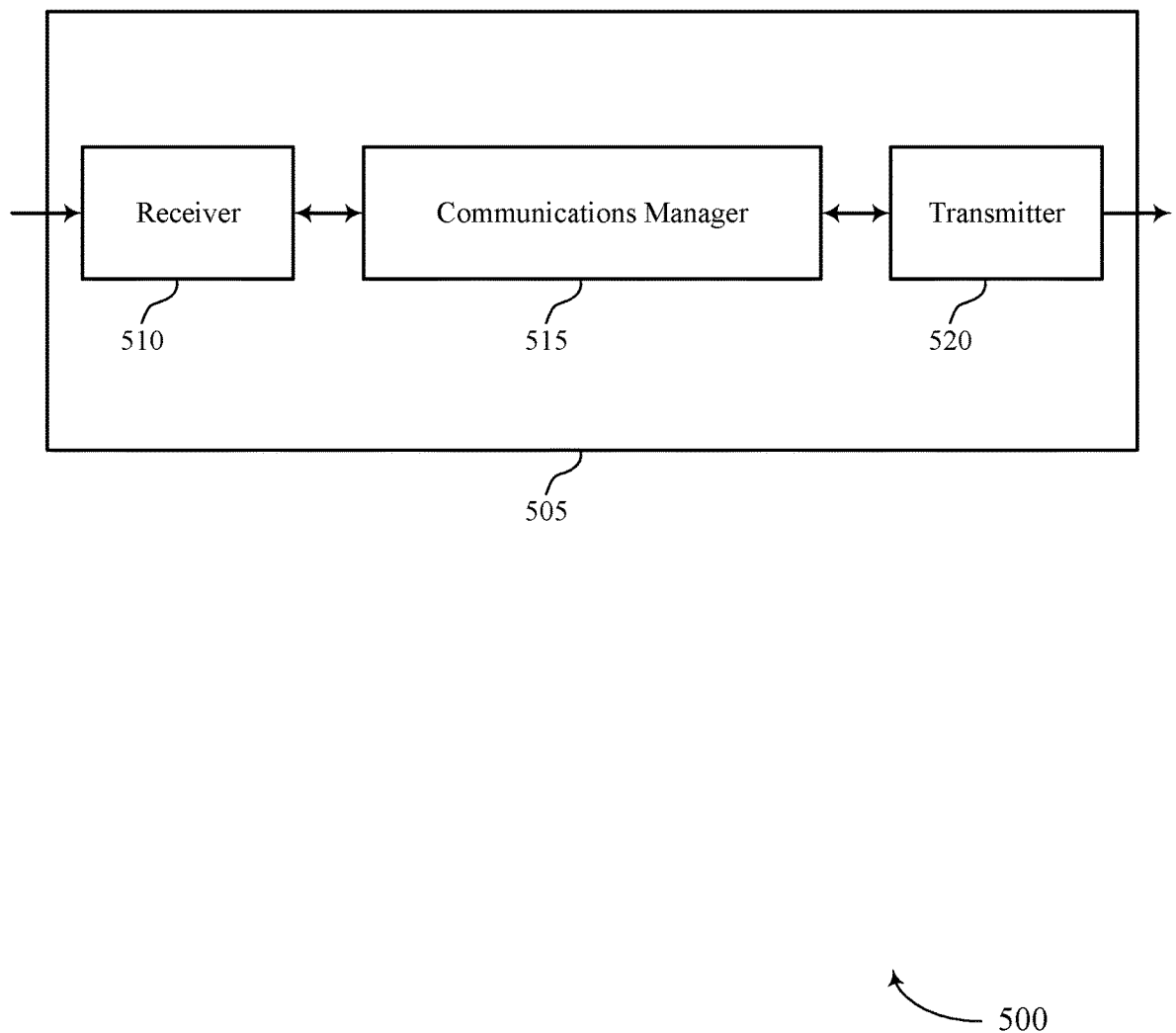
FIGS. 5 and 6 show block diagrams of devices that support multiplexing solutions in dual connectivity in accordance with aspects of the present disclosure.

FIG. 5 shows a block diagram 500 of a device 505 that supports multiplexing solutions in dual connectivity in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to multiplexing solutions in dual connectivity, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may determine that uplink communications are to be performed between the UE and a first cell group associated with a first RAT and between the UE and a second cell group associated with a second RAT, determine that the UE is configured for power sharing for the uplink communications with the first cell group associated with the first RAT and the second cell group associated with the second RAT, calculate, based on the power sharing and the uplink communications, a power reduction factor for the uplink communications between the UE and the second cell group, and perform the uplink communications with the first cell group and selectively performing, based on the power reduction factor, the uplink communications with the second cell group. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
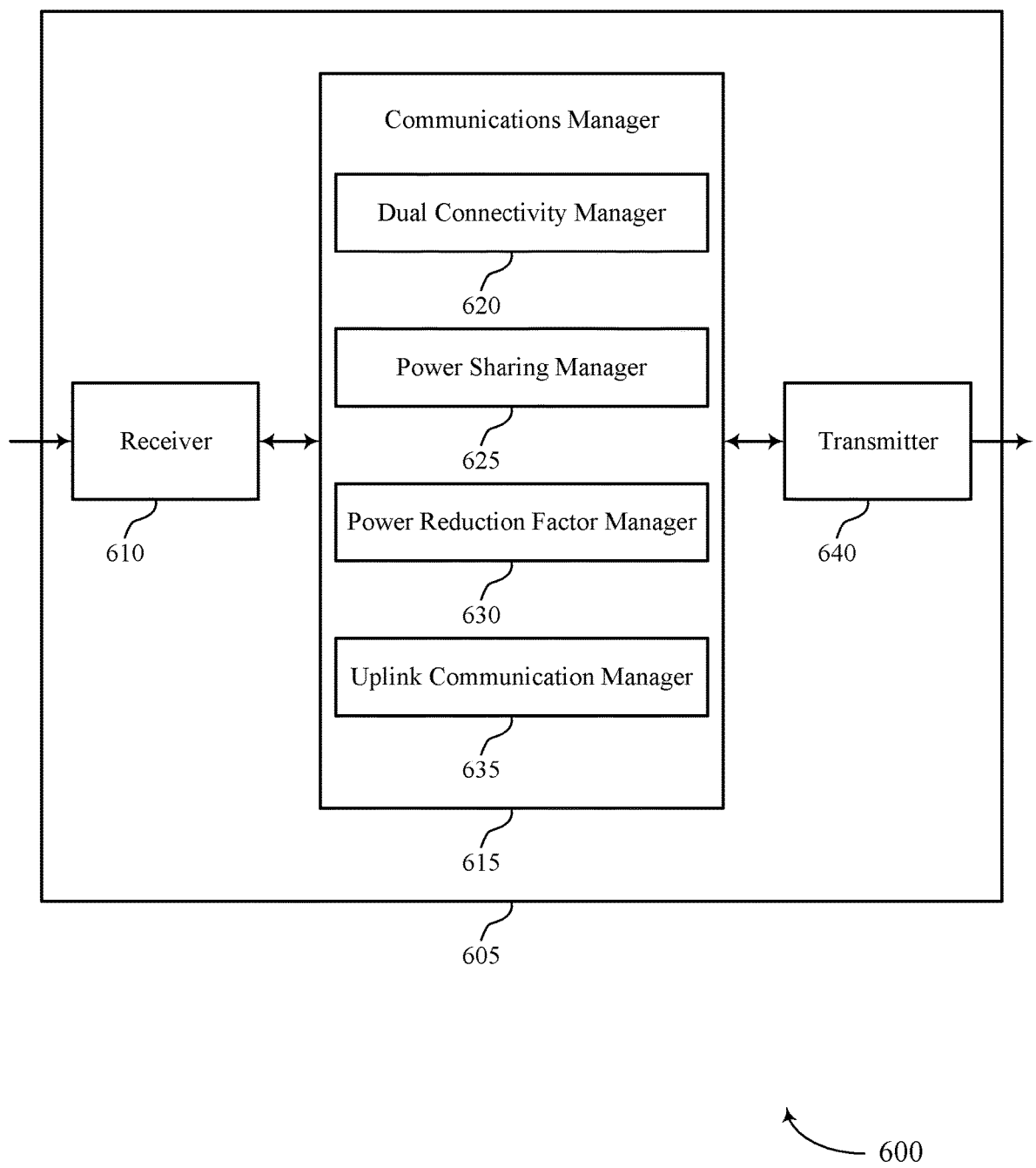

FIG. 6 shows a block diagram 600 of a device 605 that supports multiplexing solutions in dual connectivity in accordance with aspects of the present disclosure. The device 605 may be an example of aspects of a device 505 or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to multiplexing solutions in dual connectivity, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a dual connectivity manager 620, a power sharing manager 625, a power reduction factor manager 630, and an uplink communication manager 635. The communications manager 615 may be an example of aspects of the communications manager 810 described herein.

The dual connectivity manager 620 may determine that uplink communications are to be performed between the UE and a first cell group associated with a first RAT and between the UE and a second cell group associated with a second RAT.

The power sharing manager 625 may determine that the UE is configured for power sharing for the uplink communications with the first cell group associated with the first RAT and the second cell group associated with the second RAT.

The power reduction factor manager 630 may calculate, based on the power sharing and the uplink communications, a power reduction factor for the uplink communications between the UE and the second cell group.

The uplink communication manager 635 may perform the uplink communications with the first cell group and selectively performing, based on the power reduction factor, the uplink communications with the second cell group.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
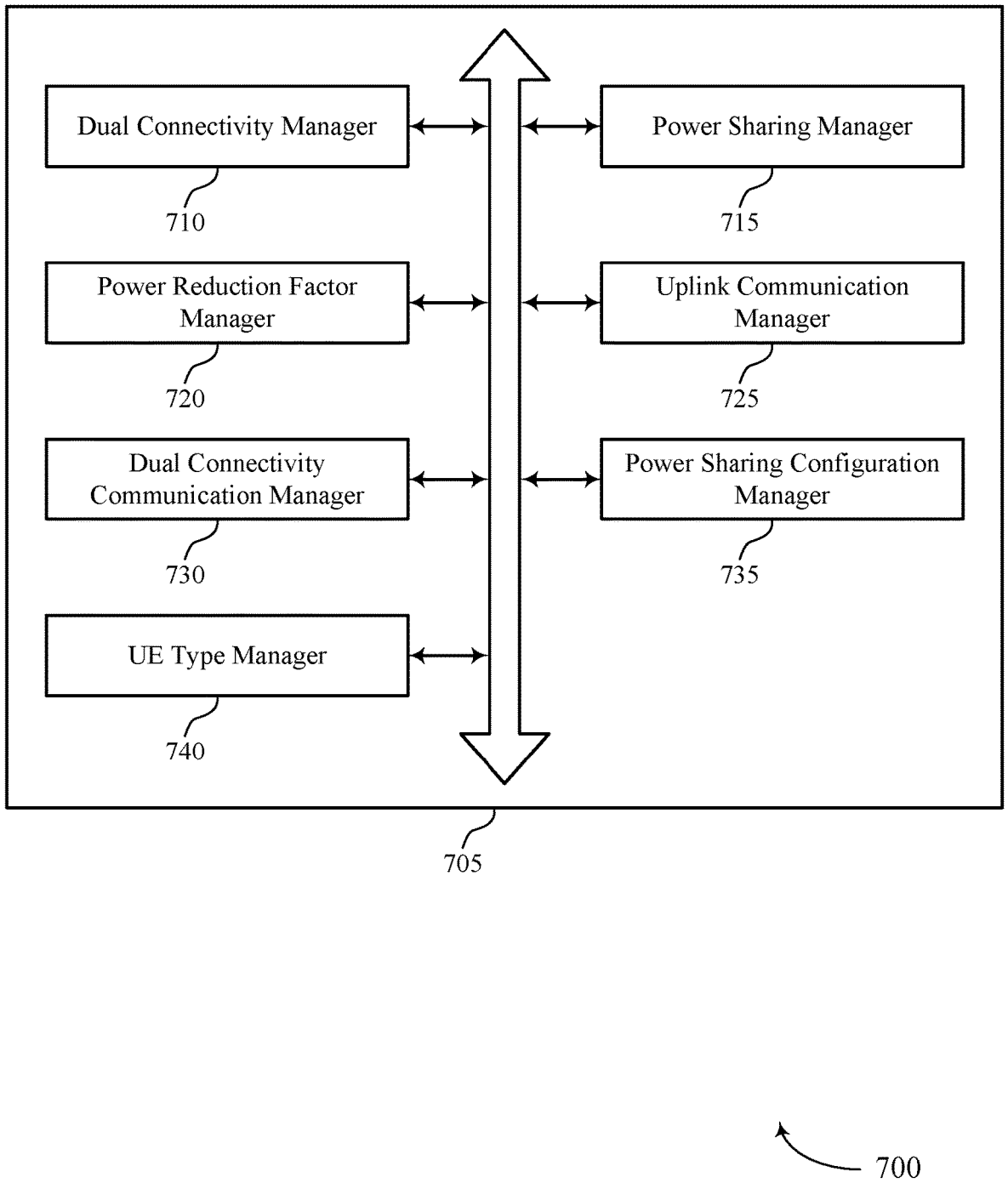
FIG. 7 shows a block diagram of a communications manager that supports multiplexing solutions in dual connectivity in accordance with aspects of the present disclosure.

FIG. 7 shows a block diagram 700 of a communications manager 705 that supports multiplexing solutions in dual connectivity in accordance with aspects of the present disclosure. The communications manager 705 may be an example of aspects of a communications manager 515, a communications manager 615, or a communications manager 810 described herein. The communications manager 705 may include a dual connectivity manager 710, a power sharing manager 715, a power reduction factor manager 720, an uplink communication manager 725, a dual connectivity communication manager 730, a power sharing configuration manager 735, and an UE type manager 740. Each of these modules may communicate, directly or indirectly, with one another (e.g., via one or more buses).

The dual connectivity manager 710 may determine that uplink communications are to be performed between the UE and a first cell group associated with a first RAT and between the UE and a second cell group associated with a second RAT.

In some cases, the first RAT includes a long term evolution (LTE) RAT and the second RAT includes a new radio (NR) RAT.

The power sharing manager 715 may determine that the UE is configured for power sharing for the uplink communications with the first cell group associated with the first RAT and the second cell group associated with the second RAT.

The power reduction factor manager 720 may calculate, based on the power sharing and the uplink communications, a power reduction factor for the uplink communications between the UE and the second cell group.

In some examples, the power reduction factor manager 720 may determine whether a first communication schedule for the uplink communications with the first cell group is time aligned with respect to a second communication schedule for the uplink communications with the second cell group, where selectively performing the uplink communications with the second cell group is based on the time alignment.

In some examples, the power reduction factor manager 720 may determine whether a first grant for the uplink communications with the first cell group is received within a defined time window with respect to a second grant for the uplink communications with the second cell group, where selectively performing the uplink communications with the second cell group is based on the first and second grants being received within the time window.

In some examples, the power reduction factor manager 720 may determine whether a first boundary for the uplink communications with the first cell group is aligned with respect to a second boundary for the uplink communications with the second cell group, where selectively performing the uplink communications with the second cell group is based on the alignment.

The power reduction factor manager 720 may determine that the first transmit power calculated for the uplink communications with the first cell group equals the third transmit power calculated for the uplink communications with the first cell group. In some examples, the power reduction factor manager 720 may transmit the uplink communications with the first cell group using the third transmit power based on determining that the first transmit power equals the third transmit power.

In some examples, the power reduction factor manager 720 may transmit the uplink communications with the second cell group using the fourth transmit power based on determining that the first transmit power equals the third transmit power, where performing the uplink communications is based on transmitting the uplink communications with the first cell group using the third transmit power and transmitting the uplink communications with the second cell group using the fourth transmit power.

In some examples, the power reduction factor manager 720 may determine that the first transmit power calculated for the uplink communications with the first cell group is different than the third transmit power calculated for the uplink communications with the first cell group. In some examples, the power reduction factor manager 720 may select a fifth transmit power for the uplink communications with the second cell group based on determining that the first transmit power is different than the third transmit power, where the fifth transmit power is less than the fourth transmit power, where performing the uplink communications is based on selecting the fifth transmit power.

In some examples, the power reduction factor manager 720 may select a sixth transmit power for the uplink communications with the first cell group based on selecting the fifth transmit power, where the sixth transmit power is less than the first transmit power and is greater than the third transmit power, where performing the uplink communications is based on selecting the sixth transmit power.

In some examples, the power reduction factor manager 720 may determine that the second cell group uses a timeline that is compatible with the first cell group, where calculating the power reduction factor is based on determining that the second cell group uses the timeline that is compatible with the first cell group.

The uplink communication manager 725 may perform the uplink communications with the first cell group and selectively performing, based on the power reduction factor, the uplink communications with the second cell group.

The dual connectivity communication manager 730 may determine that the uplink communications with the first cell group at least partially overlap in time with the uplink communications with the second cell group, where the power reduction factor is based on the overlap.

In some examples, the dual connectivity communication manager 730 may determine, based on the power reduction factor, that the uplink communications with the first cell group include a reduced transmit power transmission.

In some examples, the dual connectivity communication manager 730 may perform, based on the reduced transmit power, at least one of reducing the transmit power or dropping the uplink communications with the second cell group.

In some examples, the dual connectivity communication manager 730 may determine, based on the power reduction factor, that the uplink communications with the second cell group include a reduced transmit power transmission.

In some examples, the dual connectivity communication manager 730 may determine that a first frequency band of the uplink communications with the first cell group at least partially overlap in frequency with a second frequency band of the uplink communications with the second cell group, where the power reduction factor is based on the overlap.

The power sharing configuration manager 735 may determine that that the UE is configured for a UE capability where a first transmit power for the uplink communications of the first cell group and a second transmit power for the uplink communications of the second cell group are considered together when calculating the power reduction factor.

In some examples, the power sharing configuration manager 735 may calculate, based on the UE capability, an asymmetric power reduction factor for the uplink communications with the first cell group and with the second cell group.

In some examples, the power sharing configuration manager 735 may determine that that the UE is configured for a UE capability where a first transmit power for the uplink communications of the first cell group and a second transmit power for the uplink communications of the second cell group are not considered together when calculating the power reduction factor.

In some examples, the power sharing configuration manager 735 may calculate, based on the UE capability, a symmetric power reduction factor for the uplink communications with the first cell group and with the second cell group.

The UE type manager 740 may calculate a first transmit power for the uplink communications with the first cell group independent from a calculation of a second transmit power for the uplink communications with the second cell group.

In some examples, the UE type manager 740 may calculate a third transmit power for the uplink communications with the first cell group in consideration of a calculation of a fourth transmit power for the uplink communications with the second cell group.

In some examples, the UE type manager 740 may determine that a transmit power difference between the first transmit power and the third transmit power satisfies a threshold.

In some examples, the UE type manager 740 may drop, based on the transmit power difference, from performing the uplink communications with the second cell group.

In some examples, the UE type manager 740 may determine that a transmit power difference between the second transmit power and the fourth transmit power satisfies a threshold.

In some examples, the UE type manager 740 may drop, based on the transmit power difference, the uplink communications with the second cell group.

Figure 8:
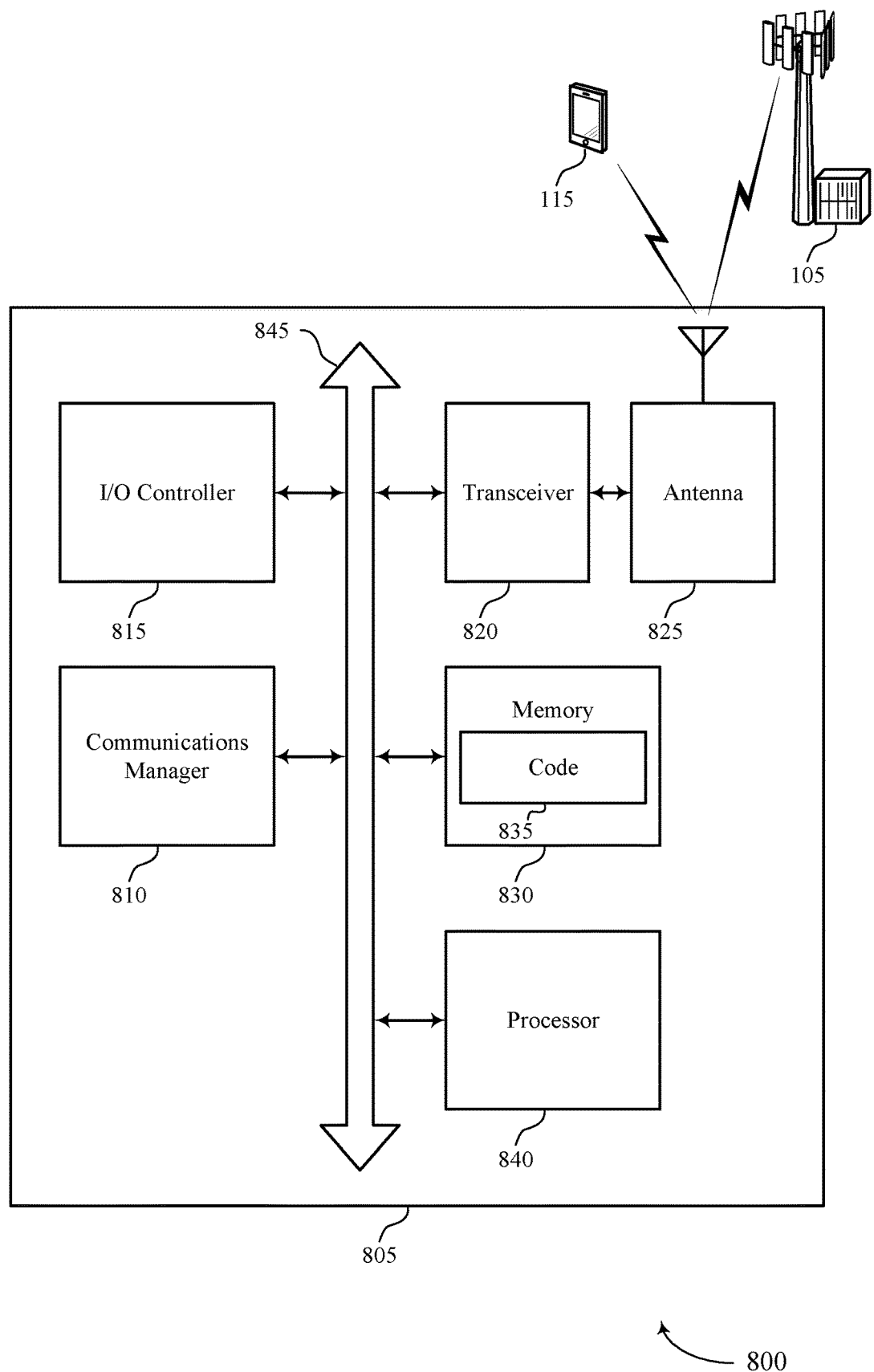
FIG. 8 shows a diagram of a system including a device that supports multiplexing solutions in dual connectivity in accordance with aspects of the present disclosure.

FIG. 8 shows a diagram of a system 800 including a device 805 that supports multiplexing solutions in dual connectivity in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may determine that uplink communications are to be performed between the UE and a first cell group associated with a first RAT and between the UE and a second cell group associated with a second RAT, determine that the UE is configured for power sharing for the uplink communications with the first cell group associated with the first RAT and the second cell group associated with the second RAT, calculate, based on the power sharing and the uplink communications, a power reduction factor for the uplink communications between the UE and the second cell group, and perform the uplink communications with the first cell group and selectively performing, based on the power reduction factor, the uplink communications with the second cell group.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting multiplexing solutions in dual connectivity).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
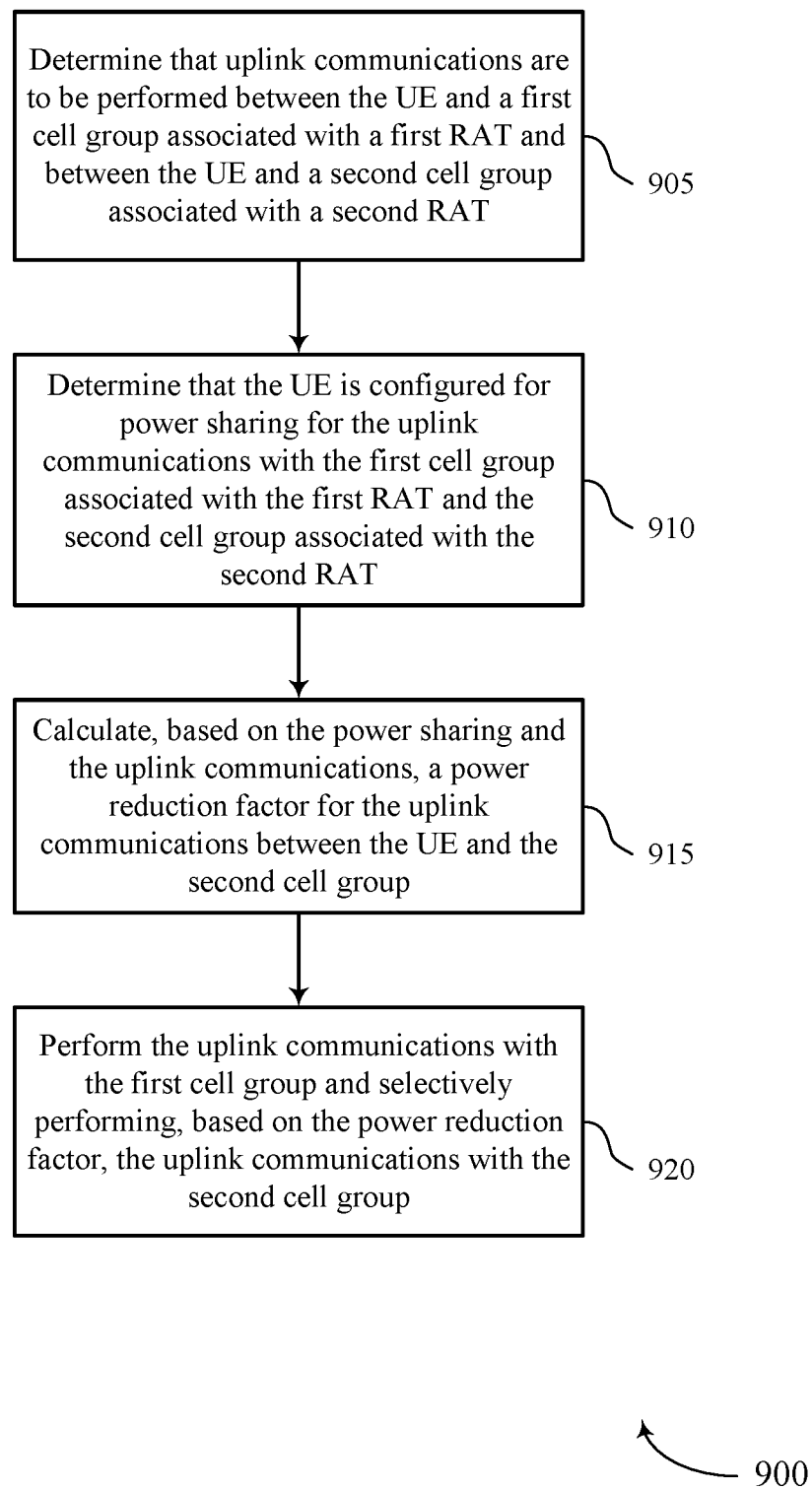
FIGS. 9 through 11 show flowcharts illustrating methods that support multiplexing solutions in dual connectivity in accordance with aspects of the present disclosure.

FIG. 9 shows a flowchart illustrating a method 900 that supports multiplexing solutions in dual connectivity in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may determine that uplink communications are to be performed between the UE and a first cell group associated with a first RAT and between the UE and a second cell group associated with a second RAT. The operations of 905 may be performed according to the methods described herein. In some examples, aspects of the operations of 905 may be performed by a dual connectivity manager as described with reference to FIGS. 5 through 8.

At 910, the UE may determine that the UE is configured for power sharing for the uplink communications with the first cell group associated with the first RAT and the second cell group associated with the second RAT. The operations of 910 may be performed according to the methods described herein. In some examples, aspects of the operations of 910 may be performed by a power sharing manager as described with reference to FIGS. 5 through 8.

At 915, the UE may calculate, based on the power sharing and the uplink communications, a power reduction factor for the uplink communications between the UE and the second cell group. The operations of 915 may be performed according to the methods described herein. In some examples, aspects of the operations of 915 may be performed by a power reduction factor manager as described with reference to FIGS. 5 through 8.

At 920, the UE may perform the uplink communications with the first cell group and selectively performing, based on the power reduction factor, the uplink communications with the second cell group. The operations of 920 may be performed according to the methods described herein. In some examples, aspects of the operations of 920 may be performed by an uplink communication manager as described with reference to FIGS. 5 through 8.

Figure 10:
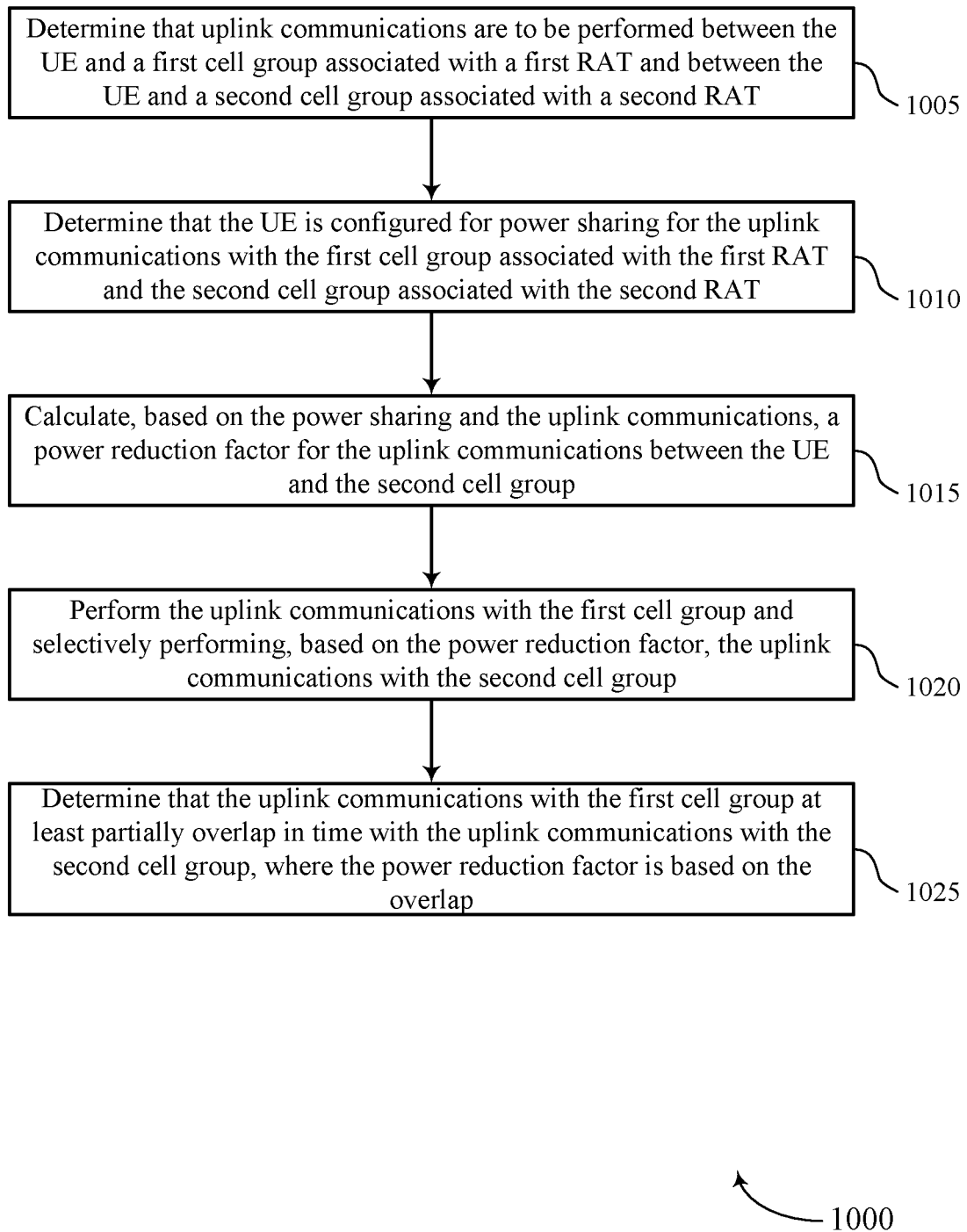

FIG. 10 shows a flowchart illustrating a method 1000 that supports multiplexing solutions in dual connectivity in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may determine that uplink communications are to be performed between the UE and a first cell group associated with a first RAT and between the UE and a second cell group associated with a second RAT. The operations of 1005 may be performed according to the methods described herein. In some examples, aspects of the operations of 1005 may be performed by a dual connectivity manager as described with reference to FIGS. 5 through 8.

At 1010, the UE may determine that the UE is configured for power sharing for the uplink communications with the first cell group associated with the first RAT and the second cell group associated with the second RAT. The operations of 1010 may be performed according to the methods described herein. In some examples, aspects of the operations of 1010 may be performed by a power sharing manager as described with reference to FIGS. 5 through 8.

At 1015, the UE may calculate, based on the power sharing and the uplink communications, a power reduction factor for the uplink communications between the UE and the second cell group. The operations of 1015 may be performed according to the methods described herein. In some examples, aspects of the operations of 1015 may be performed by a power reduction factor manager as described with reference to FIGS. 5 through 8.

At 1020, the UE may perform the uplink communications with the first cell group and selectively performing, based on the power reduction factor, the uplink communications with the second cell group. The operations of 1020 may be performed according to the methods described herein. In some examples, aspects of the operations of 1020 may be performed by an uplink communication manager as described with reference to FIGS. 5 through 8.

At 1025, the UE may determine that the uplink communications with the first cell group at least partially overlap in time with the uplink communications with the second cell group, where the power reduction factor is based on the overlap. The operations of 1025 may be performed according to the methods described herein. In some examples, aspects of the operations of 1025 may be performed by a dual connectivity communication manager as described with reference to FIGS. 5 through 8.

Figure 11:
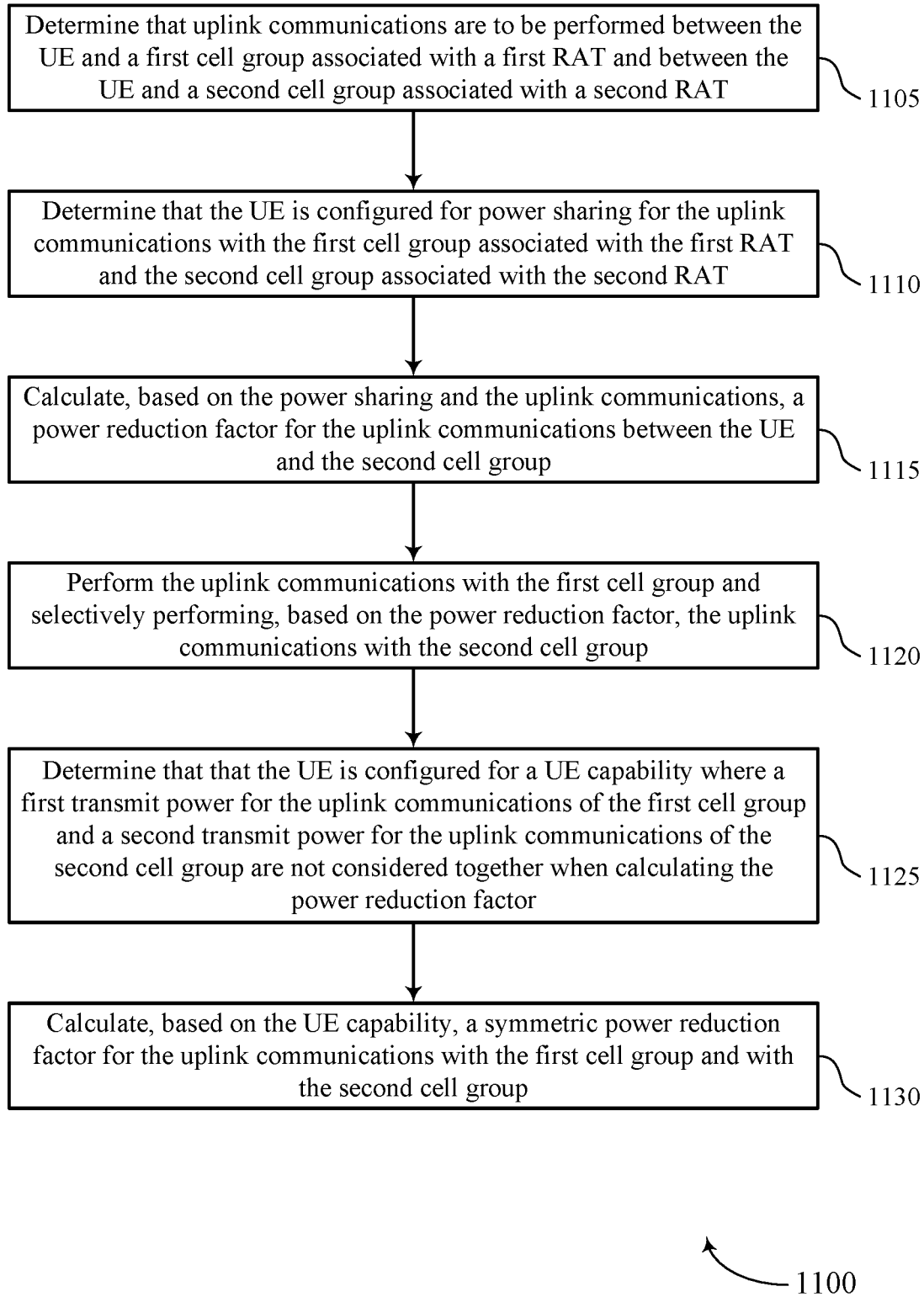

FIG. 11 shows a flowchart illustrating a method 1100 that supports multiplexing solutions in dual connectivity in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may determine that uplink communications are to be performed between the UE and a first cell group associated with a first RAT and between the UE and a second cell group associated with a second RAT. The operations of 1105 may be performed according to the methods described herein. In some examples, aspects of the operations of 1105 may be performed by a dual connectivity manager as described with reference to FIGS. 5 through 8.

At 1110, the UE may determine that the UE is configured for power sharing for the uplink communications with the first cell group associated with the first RAT and the second cell group associated with the second RAT. The operations of 1110 may be performed according to the methods described herein. In some examples, aspects of the operations of 1110 may be performed by a power sharing manager as described with reference to FIGS. 5 through 8.

At 1115, the UE may calculate, based on the power sharing and the uplink communications, a power reduction factor for the uplink communications between the UE and the second cell group. The operations of 1115 may be performed according to the methods described herein. In some examples, aspects of the operations of 1115 may be performed by a power reduction factor manager as described with reference to FIGS. 5 through 8.

At 1120, the UE may perform the uplink communications with the first cell group and selectively performing, based on the power reduction factor, the uplink communications with the second cell group. The operations of 1120 may be performed according to the methods described herein. In some examples, aspects of the operations of 1120 may be performed by an uplink communication manager as described with reference to FIGS. 5 through 8.

At 1125, the UE may determine that that the UE is configured for a UE capability where a first transmit power for the uplink communications of the first cell group and a second transmit power for the uplink communications of the second cell group are not considered together when calculating the power reduction factor. The operations of 1125 may be performed according to the methods described herein. In some examples, aspects of the operations of 1125 may be performed by a power sharing configuration manager as described with reference to FIGS. 5 through 8.

At 1130, the UE may calculate, based on the UE capability, a symmetric power reduction factor for the uplink communications with the first cell group and with the second cell group. The operations of 1130 may be performed according to the methods described herein. In some examples, aspects of the operations of 1130 may be performed by a power sharing configuration manager as described with reference to FIGS. 5 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
determining that uplink communications are to be performed between the UE and a first cell group associated with a first radio access technology (RAT) and between the UE and a second cell group associated with a second RAT;
determining that the UE is configured for power sharing for the uplink communications with the first cell group associated with the first RAT and the second cell group associated with the second RAT;
identifying a power sharing type of the UE between a first power sharing type configured to perform power sharing asymmetrically for the first cell group and the second cell group and a second power sharing type configured to perform power sharing symmetrically for the first cell group and the second cell group;
calculating a power reduction factor for the uplink communications between the UE and the second cell group, wherein the calculating is based at least in part on the power sharing, the power sharing type of the UE, and an overlap in time between the uplink communications with the first cell group and the uplink communications with the second cell group; and
performing the uplink communications with the first cell group and selectively performing the uplink communications with the second cell group based at least in part on the power reduction factor and a hop boundary alignment between the uplink communications with the second cell group and the uplink communications with the first cell group.

2. The method of claim 1, further comprising:
determining, based at least in part on the power sharing type of the UE, that the UE is configured to calculate a first transmit power for the uplink communications of the first cell group and a second transmit power for the uplink communications of the second cell group together when calculating the power reduction factor; and
calculating, based at least in part on the power sharing type of the UE, an asymmetric power reduction factor for the uplink communications with the first cell group and with the second cell group.

3. The method of claim 1, further comprising:
determining, based at least in part on the power sharing type of the UE, that that the UE is configured to calculate a first transmit power for the uplink communications of the first cell group and a second transmit power for the uplink communications of the second cell group independently when calculating the power reduction factor; and
calculating, based at least in part on the power sharing type of the UE, a symmetric power reduction factor for the uplink communications with the first cell group and with the second cell group.

4. The method of claim 1, wherein calculating the power reduction factor comprises:
calculating a first transmit power for the uplink communications with the first cell group independent from a calculation of a second transmit power for the uplink communications with the second cell group; and
calculating a third transmit power for the uplink communications with the first cell group in consideration of a calculation of a fourth transmit power for the uplink communications with the second cell group.

5. The method of claim 4, further comprising:
determining that a transmit power difference between the first transmit power and the third transmit power satisfies a threshold; and
dropping, based at least in part on the transmit power difference, from performing the uplink communications with the second cell group.

6. The method of claim 4, further comprising:
determining that a transmit power difference between the second transmit power and the fourth transmit power satisfies a threshold; and
dropping, based at least in part on the transmit power difference, the uplink communications with the second cell group.

7. The method of claim 4, further comprising:
determining that the first transmit power calculated for the uplink communications with the first cell group equals the third transmit power calculated for the uplink communications with the first cell group;
transmitting the uplink communications with the first cell group using the third transmit power based at least in part on determining that the first transmit power equals the third transmit power; and
transmitting the uplink communications with the second cell group using the fourth transmit power based at least in part on determining that the first transmit power equals the third transmit power, wherein performing the uplink communications is based at least in part on transmitting the uplink communications with the first cell group using the third transmit power and transmitting the uplink communications with the second cell group using the fourth transmit power.

8. The method of claim 4, further comprising:
determining that the first transmit power calculated for the uplink communications with the first cell group is different than the third transmit power calculated for the uplink communications with the first cell group; and
selecting a fifth transmit power for the uplink communications with the second cell group based at least in part on determining that the first transmit power is different than the third transmit power, wherein the fifth transmit power is less than the fourth transmit power, wherein performing the uplink communications is based at least in part on selecting the fifth transmit power.

9. The method of claim 8, further comprising:
selecting a sixth transmit power for the uplink communications with the first cell group based at least in part on selecting the fifth transmit power, wherein the sixth transmit power is less than the first transmit power and is greater than the third transmit power, wherein performing the uplink communications is based at least in part on selecting the sixth transmit power.

10. The method of claim 1, further comprising:
determining that the uplink communications with the first cell group at least partially overlap in time with the uplink communications with the second cell group, wherein the power reduction factor is based at least in part on the overlap.

11. The method of claim 10, further comprising:
determining, based at least in part on the power reduction factor, that the uplink communications with the first cell group comprise a reduced transmit power transmission; and performing, based at least in part on the reduced transmit power, one or both of reducing the transmit power or dropping the uplink communications with the second cell group.

12. The method of claim 10, further comprising:
determining, based at least in part on the power reduction factor, that the uplink communications with the second cell group comprise a reduced transmit power transmission; and
performing, based at least in part on the reduced transmit power, one or both of reducing the transmit power or dropping the uplink communications with the second cell group.

13. The method of claim 10, further comprising:
determining that a first frequency band of the uplink communications with the first cell group at least partially overlap in frequency with a second frequency band of the uplink communications with the second cell group, wherein the power reduction factor is based at least in part on the overlap.

14. The method of claim 1, further comprising:
determining that the second cell group uses a timeline that is compatible with the first cell group, wherein calculating the power reduction factor is based at least in part on determining that the second cell group uses the timeline that is compatible with the first cell group.

15. The method of claim 1, wherein calculating the power reduction factor comprises:
determining whether a first communication schedule for the uplink communications with the first cell group is time aligned with respect to a second communication schedule for the uplink communications with the second cell group, wherein selectively performing the uplink communications with the second cell group is based on the time alignment.

16. The method of claim 1, wherein calculating the power reduction factor comprises:
determining whether a first grant for the uplink communications with the first cell group is received within a defined time window with respect to a second grant for the uplink communications with the second cell group, wherein selectively performing the uplink communications with the second cell group is based on the first and second grants being received within the time window.

17. The method of claim 1, wherein calculating the power reduction factor comprises:
determining whether a first boundary for the uplink communications with the first cell group is aligned with respect to a second boundary for the uplink communications with the second cell group, wherein selectively performing the uplink communications with the second cell group is based on the alignment.

18. The method of claim 1, wherein the first RAT comprises a long term evolution (LTE) RAT and the second RAT comprises a new radio (NR) RAT.

19. An apparatus for wireless communication at a user equipment (UE), comprising:
a processor;
memory coupled to the processor; and
instructions stored in the memory and executable by the processor to cause the apparatus to:
determine that uplink communications are to be performed between the UE and a first cell group associated with a first radio access technology (RAT) and between the UE and a second cell group associated with a second RAT;
determine that the UE is configured for power sharing for the uplink communications with the first cell group associated with the first RAT and the second cell group associated with the second RAT;
identify a power sharing type of the UE between a first power sharing type configured to perform power sharing asymmetrically for the first cell group and the second cell group and a second power sharing type configured to perform power sharing symmetrically for the first cell group and the second cell group;
calculate a power reduction factor for the uplink communications between the UE and the second cell group, wherein the calculating is based at least in part on the power sharing, the power sharing type of the UE, and an overlap in time between the uplink communications with the first cell group and the uplink communications with the second cell group; and
perform the uplink communications with the first cell group and selectively perform the uplink communications with the second cell group based at least in part on the power reduction factor and a hop boundary alignment between the uplink communications with the second cell group and the uplink communications with the first cell group.

20. The apparatus of claim 19, wherein the instructions are further executable by the processor to cause the apparatus to:
determine, based at least in part on power sharing type of the UE, that the UE is configured to calculate a first transmit power for the uplink communications of the first cell group and a second transmit power for the uplink communications of the second cell group together when calculating the power reduction factor; and
calculate, based at least in part on the power sharing type of the UE, an asymmetric power reduction factor for the uplink communications with the first cell group and with the second cell group.

21. The apparatus of claim 19, wherein the instructions are further executable by the processor to cause the apparatus to:
determine, based at least in part on the power sharing type of the UE, that that the UE is configured to calculate a first transmit power for the uplink communications of the first cell group and a second transmit power for the uplink communications of the second cell group independently when calculating the power reduction factor; and
calculate, based at least in part on the power sharing type of the UE, a symmetric power reduction factor for the uplink communications with the first cell group and with the second cell group.

22. The apparatus of claim 19, wherein the instructions to calculate the power reduction factor are executable by the processor to cause the apparatus to:
calculate a first transmit power for the uplink communications with the first cell group independent from a calculation of a second transmit power for the uplink communications with the second cell group; and
calculate a third transmit power for the uplink communications with the first cell group in consideration of a calculation of a fourth transmit power for the uplink communications with the second cell group.

23. The apparatus of claim 22, wherein the instructions are further executable by the processor to cause the apparatus to:
  determine that a transmit power difference between the first transmit power and the third transmit power satisfies a threshold; and
  drop, based at least in part on the transmit power difference, from performing the uplink communications with the second cell group.

24. The apparatus of claim 22, wherein the instructions are further executable by the processor to cause the apparatus to:
  determine that a transmit power difference between the second transmit power and the fourth transmit power satisfies a threshold; and
  drop, based at least in part on the transmit power difference, the uplink communications with the second cell group.

25. The apparatus of claim 22, wherein the instructions are further executable by the processor to cause the apparatus to:
  determine that the first transmit power calculated for the uplink communications with the first cell group equals the third transmit power calculated for the uplink communications with the first cell group;
  transmit the uplink communications with the first cell group using the third transmit power based at least in part on determining that the first transmit power equals the third transmit power; and
  transmit the uplink communications with the second cell group using the fourth transmit power based at least in part on determining that the first transmit power equals the third transmit power, wherein performing the uplink communications is based at least in part on transmitting the uplink communications with the first cell group using the third transmit power and transmitting the uplink communications with the second cell group using the fourth transmit power.

26. The apparatus of claim 22, wherein the instructions are further executable by the processor to cause the apparatus to:
  determine that the first transmit power calculated for the uplink communications with the first cell group is different than the third transmit power calculated for the uplink communications with the first cell group; and
  select a fifth transmit power for the uplink communications with the second cell group based at least in part on determining that the first transmit power is different than the third transmit power, wherein the fifth transmit power is less than the fourth transmit power, wherein performing the uplink communications is based at least in part on selecting the fifth transmit power.

27. The apparatus of claim 26, wherein the instructions are further executable by the processor to cause the apparatus to:
  select a sixth transmit power for the uplink communications with the first cell group based at least in part on selecting the fifth transmit power, wherein the sixth transmit power is less than the first transmit power and is greater than the third transmit power, wherein performing the uplink communications is based at least in part on selecting the sixth transmit power.

28. The apparatus of claim 19, wherein the instructions are further executable by the processor to cause the apparatus to:
  determine that the uplink communications with the first cell group at least partially overlap in time with the uplink communications with the second cell group, wherein the power reduction factor is based at least in part on the overlap.

29. The apparatus of claim 28, wherein the instructions are further executable by the processor to cause the apparatus to:
  determine, based at least in part on the power reduction factor, that the uplink communications with the first cell group comprise a reduced transmit power transmission; and
  perform, based at least in part on the reduced transmit power, one or both of reducing the transmit power or dropping the uplink communications with the second cell group.

30. The apparatus of claim 28, wherein the instructions are further executable by the processor to cause the apparatus to:
  determine, based at least in part on the power reduction factor, that the uplink communications with the second cell group comprise a reduced transmit power transmission; and
  perform, based at least in part on the reduced transmit power, one or both of reducing the transmit power or dropping the uplink communications with the second cell group.

31. The apparatus of claim 28, wherein the instructions are further executable by the processor to cause the apparatus to:
  determine that a first frequency band of the uplink communications with the first cell group at least partially overlap in frequency with a second frequency band of the uplink communications with the second cell group, wherein the power reduction factor is based at least in part on the overlap.

32. The apparatus of claim 19, wherein the instructions are further executable by the processor to cause the apparatus to:
  determine that the second cell group uses a timeline that is compatible with the first cell group, wherein calculating the power reduction factor is based at least in part on determining that the second cell group uses the timeline that is compatible with the first cell group.

33. The apparatus of claim 19, wherein the instructions to calculate the power reduction factor are executable by the processor to cause the apparatus to:
  determine whether a first communication schedule for the uplink communications with the first cell group is time aligned with respect to a second communication schedule for the uplink communications with the second cell group, wherein selectively performing the uplink communications with the second cell group is based on the time alignment.

34. The apparatus of claim 19, wherein the instructions to calculate the power reduction factor are executable by the processor to cause the apparatus to:
  determine whether a first grant for the uplink communications with the first cell group is received within a defined time window with respect to a second grant for the uplink communications with the second cell group, wherein selectively performing the uplink communications with the second cell group is based on the first and second grants being received within the time window.

35. The apparatus of claim 19, wherein the instructions to calculate the power reduction factor are executable by the processor to cause the apparatus to:

determine whether a first boundary for the uplink communications with the first cell group is aligned with respect to a second boundary for the uplink communications with the second cell group, wherein selectively performing the uplink communications with the second cell group is based on the alignment.

36. The apparatus of claim 19, wherein the first RAT comprises a long term evolution (LTE) RAT and the second RAT comprises a new radio (NR) RAT.

37. An apparatus for wireless communication at a user equipment (UE), comprising:
means for determining that uplink communications are to be performed between the UE and a first cell group associated with a first radio access technology (RAT) and between the UE and a second cell group associated with a second RAT;
means for determining that the UE is configured for power sharing for the uplink communications with the first cell group associated with the first RAT and the second cell group associated with the second RAT;
means for identifying a power sharing type of the UE between a first power sharing type configured to perform power sharing asymmetrically for the first cell group and the second cell group and a second power sharing type configured to perform power sharing symmetrically for the first cell group and the second cell group;
means for calculating a power reduction factor for the uplink communications between the UE and the second cell group, wherein the calculating is based at least in part on the power sharing, the power sharing type of the UE, and and overlap in time between the uplink communications with the first cell group and the uplink communications with the second cell group; and
means for performing the uplink communications with the first cell group and selectively performing the uplink communications with the second cell group based at least in part on the power reduction factor and a hop boundary alignment between the uplink communications with the second cell group and the uplink communications with the first cell group.

38. The apparatus of claim 37, further comprising:
means for determining, based at least in part on the power sharing type of the UE, that the UE is configured to calculate a first transmit power for the uplink communications of the first cell group and a second transmit power for the uplink communications of the second cell group together when calculating the power reduction factor; and
means for calculating, based at least in part on the power sharing type of the UE, an asymmetric power reduction factor for the uplink communications with the first cell group and with the second cell group.

39. The apparatus of claim 37, further comprising:
means for determining, based at least in part on the power sharing type of the UE, that that the UE is configured to calculate a first transmit power for the uplink communications of the first cell group and a second transmit power for the uplink communications of the second cell group independently when calculating the power reduction factor; and
means for calculating, based at least in part on the power sharing type of the UE, a symmetric power reduction factor for the uplink communications with the first cell group and with the second cell group.

40. The apparatus of claim 37, wherein the means for calculating the power reduction factor comprises:
means for calculating a first transmit power for the uplink communications with the first cell group independent from a calculation of a second transmit power for the uplink communications with the second cell group; and
means for calculating a third transmit power for the uplink communications with the first cell group in consideration of a calculation of a fourth transmit power for the uplink communications with the second cell group.

41. The apparatus of claim 40, further comprising:
means for determining that a transmit power difference between the first transmit power and the third transmit power satisfies a threshold; and
means for dropping, based at least in part on the transmit power difference, from performing the uplink communications with the second cell group.

42. The apparatus of claim 40, further comprising:
means for determining that a transmit power difference between the second transmit power and the fourth transmit power satisfies a threshold; and
means for dropping, based at least in part on the transmit power difference, the uplink communications with the second cell group.

43. The apparatus of claim 40, further comprising:
means for determining that the first transmit power calculated for the uplink communications with the first cell group equals the third transmit power calculated for the uplink communications with the first cell group;
means for transmitting the uplink communications with the first cell group using the third transmit power based at least in part on determining that the first transmit power equals the third transmit power; and
means for transmitting the uplink communications with the second cell group using the fourth transmit power based at least in part on determining that the first transmit power equals the third transmit power, wherein performing the uplink communications is based at least in part on transmitting the uplink communications with the first cell group using the third transmit power and transmitting the uplink communications with the second cell group using the fourth transmit power.

44. The apparatus of claim 40, further comprising:
means for determining that the first transmit power calculated for the uplink communications with the first cell group is different than the third transmit power calculated for the uplink communications with the first cell group; and
means for selecting a fifth transmit power for the uplink communications with the second cell group based at least in part on determining that the first transmit power is different than the third transmit power, wherein the fifth transmit power is less than the fourth transmit power, wherein performing the uplink communications is based at least in part on selecting the fifth transmit power.

45. The apparatus of claim 44, further comprising:
means for selecting a sixth transmit power for the uplink communications with the first cell group based at least in part on selecting the fifth transmit power, wherein the sixth transmit power is less than the first transmit power and is greater than the third transmit power, wherein performing the uplink communications is based at least in part on selecting the sixth transmit power.

46. The apparatus of claim 37, further comprising:
means for determining that the uplink communications with the first cell group at least partially overlap in time with the uplink communications with the second cell group, wherein the power reduction factor is based at least in part on the overlap.

47. The apparatus of claim 46, further comprising:
means for determining, based at least in part on the power reduction factor, that the uplink communications with the first cell group comprise a reduced transmit power transmission; and
means for performing, based at least in part on the reduced transmit power, one or both of reducing the transmit power or dropping the uplink communications with the second cell group.

48. The apparatus of claim 46, further comprising:
means for determining, based at least in part on the power reduction factor, that the uplink communications with the second cell group comprise a reduced transmit power transmission; and
means for performing, based at least in part on the reduced transmit power, one or both of reducing the transmit power or dropping the uplink communications with the second cell group.

49. The apparatus of claim 46, further comprising:
means for determining that a first frequency band of the uplink communications with the first cell group at least partially overlap in frequency with a second frequency band of the uplink communications with the second cell group, wherein the power reduction factor is based at least in part on the overlap.

50. The apparatus of claim 37, further comprising:
means for determining that the second cell group uses a timeline that is compatible with the first cell group, wherein calculating the power reduction factor is based at least in part on determining that the second cell group uses the timeline that is compatible with the first cell group.

51. The apparatus of claim 37, wherein the means for calculating the power reduction factor comprises:
means for determining whether a first communication schedule for the uplink communications with the first cell group is time aligned with respect to a second communication schedule for the uplink communications with the second cell group, wherein selectively performing the uplink communications with the second cell group is based on the time alignment.

52. The apparatus of claim 37, wherein the means for calculating the power reduction factor comprises:
means for determining whether a first grant for the uplink communications with the first cell group is received within a defined time window with respect to a second grant for the uplink communications with the second cell group, wherein selectively performing the uplink communications with the second cell group is based on the first and second grants being received within the time window.

53. The apparatus of claim 37, wherein the means for calculating the power reduction factor comprises:
means for determining whether a first boundary for the uplink communications with the first cell group is aligned with respect to a second boundary for the uplink communications with the second cell group, wherein selectively performing the uplink communications with the second cell group is based on the alignment.

54. The apparatus of claim 37, wherein the first RAT comprises a long term evolution (LTE) RAT and the second RAT comprises a new radio (NR) RAT.

55. A non-transitory computer-readable medium storing code for wireless communication at a user equipment (UE), the code comprising instructions executable by a processor to:
determine that uplink communications are to be performed between the UE and a first cell group associated with a first radio access technology (RAT) and between the UE and a second cell group associated with a second RAT;
determine that the UE is configured for power sharing for the uplink communications with the first cell group associated with the first RAT and the second cell group associated with the second RAT;
identify a power sharing type of the UE between a first power sharing type configured to perform power sharing asymmetrically for the first cell group and the second cell group and a second power sharing type configured to perform power sharing symmetrically for the first cell group and the second cell group;
calculate a power reduction factor for the uplink communications between the UE and the second cell group, wherein the calculating is based at least in part on the power sharing, the power sharing type of the UE, and an overlap in time between the uplink communications with the first cell group and the uplink communications with the second cell group; and
perform the uplink communications with the first cell group and selectively perform the uplink communications with the second cell group based at least in part on the power reduction factor and a hop boundary alignment between the uplink communications with the second cell group and the uplink communications with the first cell group.

56. The non-transitory computer-readable medium of claim 55, wherein the instructions are further executable to:
determine, based at least in part on the power sharing type of the UE, that the UE is configured to calculate a first transmit power for the uplink communications of the first cell group and a second transmit power for the uplink communications of the second cell group together when calculating the power reduction factor; and
calculate, based at least in part on the power sharing type of the UE, an asymmetric power reduction factor for the uplink communications with the first cell group and with the second cell group.

57. The non-transitory computer-readable medium of claim 55, wherein the instructions are further executable to:
determine, based at least in part on the power sharing type of the UE, that that the UE is configured to calculate a first transmit power for the uplink communications of the first cell group and a second transmit power for the uplink communications of the second cell group independently when calculating the power reduction factor; and
calculate, based at least in part on the power sharing type of the UE, a symmetric power reduction factor for the uplink communications with the first cell group and with the second cell group.

58. The non-transitory computer-readable medium of claim 55, wherein the instructions to calculate the power reduction factor are executable to:
calculate a first transmit power for the uplink communications with the first cell group independent from a calculation of a second transmit power for the uplink communications with the second cell group; and calculate a third transmit power for the uplink communications with the first cell group in consideration of a calculation of a fourth transmit power for the uplink communications with the second cell group.

59. The non-transitory computer-readable medium of claim 58, wherein the instructions are further executable to:
determine that a transmit power difference between the first transmit power and the third transmit power satisfies a threshold; and
drop, based at least in part on the transmit power difference, from performing the uplink communications with the second cell group.

60. The non-transitory computer-readable medium of claim 58, wherein the instructions are further executable to:
determine that a transmit power difference between the second transmit power and the fourth transmit power satisfies a threshold; and
drop, based at least in part on the transmit power difference, the uplink communications with the second cell group.

61. The non-transitory computer-readable medium of claim 58, wherein the instructions are further executable to:
determine that the first transmit power calculated for the uplink communications with the first cell group equals the third transmit power calculated for the uplink communications with the first cell group;
transmit the uplink communications with the first cell group using the third transmit power based at least in part on determining that the first transmit power equals the third transmit power; and
transmit the uplink communications with the second cell group using the fourth transmit power based at least in part on determining that the first transmit power equals the third transmit power, wherein performing the uplink communications is based at least in part on transmitting the uplink communications with the first cell group using the third transmit power and transmitting the uplink communications with the second cell group using the fourth transmit power.

62. The non-transitory computer-readable medium of claim 58, wherein the instructions are further executable to:
determine that the first transmit power calculated for the uplink communications with the first cell group is different than the third transmit power calculated for the uplink communications with the first cell group; and
select a fifth transmit power for the uplink communications with the second cell group based at least in part on determining that the first transmit power is different than the third transmit power, wherein the fifth transmit power is less than the fourth transmit power, wherein performing the uplink communications is based at least in part on selecting the fifth transmit power.

63. The non-transitory computer-readable medium of claim 62, wherein the instructions are further executable to:
select a sixth transmit power for the uplink communications with the first cell group based at least in part on selecting the fifth transmit power, wherein the sixth transmit power is less than the first transmit power and is greater than the third transmit power, wherein performing the uplink communications is based at least in part on selecting the sixth transmit power.

64. The non-transitory computer-readable medium of claim 55, wherein the instructions are further executable to:
determine that the uplink communications with the first cell group at least partially overlap in time with the uplink communications with the second cell group, wherein the power reduction factor is based at least in part on the overlap.

65. The non-transitory computer-readable medium of claim 64, wherein the instructions are further executable to:
determine, based at least in part on the power reduction factor, that the uplink communications with the first cell group comprise a reduced transmit power transmission; and
perform, based at least in part on the reduced transmit power, one or both of reducing the transmit power or dropping the uplink communications with the second cell group.

66. The non-transitory computer-readable medium of claim 64, wherein the instructions are further executable to:
determine, based at least in part on the power reduction factor, that the uplink communications with the second cell group comprise a reduced transmit power transmission; and
perform, based at least in part on the reduced transmit power, one or both of reducing the transmit power or dropping the uplink communications with the second cell group.

67. The non-transitory computer-readable medium of claim 64, wherein the instructions are further executable to:
determine that a first frequency band of the uplink communications with the first cell group at least partially overlap in frequency with a second frequency band of the uplink communications with the second cell group, wherein the power reduction factor is based at least in part on the overlap.

68. The non-transitory computer-readable medium of claim 55, wherein the instructions are further executable to:
determine that the second cell group uses a timeline that is compatible with the first cell group, wherein calculating the power reduction factor is based at least in part on determining that the second cell group uses the timeline that is compatible with the first cell group.

69. The non-transitory computer-readable medium of claim 55, wherein the instructions to calculate the power reduction factor are executable to:
determine whether a first communication schedule for the uplink communications with the first cell group is time aligned with respect to a second communication schedule for the uplink communications with the second cell group, wherein selectively performing the uplink communications with the second cell group is based on the time alignment.

70. The non-transitory computer-readable medium of claim 55, wherein the instructions to calculate the power reduction factor are executable to:
determine whether a first grant for the uplink communications with the first cell group is received within a defined time window with respect to a second grant for the uplink communications with the second cell group, wherein selectively performing the uplink communications with the second cell group is based on the first and second grants being received within the time window.

71. The non-transitory computer-readable medium of claim 55, wherein the instructions to calculate the power reduction factor are executable to:
determine whether a first boundary for the uplink communications with the first cell group is aligned with respect to a second boundary for the uplink communications with the second cell group, wherein selectively performing the uplink communications with the second cell group is based on the alignment.

72. The non-transitory computer-readable medium of claim 55, wherein the first RAT comprises a long term evolution (LTE) RAT and the second RAT comprises a new radio (NR) RAT.

* * * * *